United States Patent
Kitahara et al.

(10) Patent No.: US 11,172,250 B2
(45) Date of Patent: *Nov. 9, 2021

(54) RECEPTION APPARATUS, RECEPTION METHOD, TRANSMISSION APPARATUS AND TRANSMISSION METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,123

(22) Filed: Jan. 10, 2020

(65) Prior Publication Data

US 2020/0228861 A1 Jul. 16, 2020

Related U.S. Application Data

(63) Continuation of application No. 15/311,643, filed as application No. PCT/JP2015/064672 on May 22, 2015, now Pat. No. 10,567,833.

(30) Foreign Application Priority Data

May 30, 2014 (JP) .................................. 2014-112071

(51) Int. Cl.
*H04N 21/438* (2011.01)
*H04N 21/435* (2011.01)
(Continued)

(52) U.S. Cl.
CPC ........ *H04N 21/4383* (2013.01); *H04H 20/93* (2013.01); *H04H 60/13* (2013.01);
(Continued)

(58) Field of Classification Search
CPC ............. H04N 21/235; H04N 21/4383; H04N 21/482; H04N 21/6125; H04N 21/633;
(Continued)

(56) References Cited

U.S. PATENT DOCUMENTS

2002/0054087 A1 5/2002 Noll
2013/0014202 A1 1/2013 Suh
(Continued)

FOREIGN PATENT DOCUMENTS

JP 2012-156712 8/2012
WO WO 2012/157718 A1 11/2012
(Continued)

OTHER PUBLICATIONS

Japanese Office Action dated Jun. 20, 2019 in Japanese Patent Application No. 2016-523456.

*Primary Examiner* — Rong Le
(74) *Attorney, Agent, or Firm* — Oblon, McClelland, Maier & Neustadt, L.L.P.

(57) ABSTRACT

The present technology relates to a reception apparatus, a reception method, a transmission apparatus and a transmission method in which NRT service is provided in digital broadcasting using an IP transmission method. There is provided a reception apparatus including: a channel selection control unit that performs a channel selection control of channel-selecting digital broadcasting using the IP transmission method; an acquisition control unit that controls acquisition of an application delivered through broadcasting or communication in the digital broadcasting based on signaling information transmitted at a layer higher than an IP layer in a protocol layer of the IP transmission method; and an application execution unit that executes the application acquired. The present technology is applicable to a television receiver, for example.

20 Claims, 25 Drawing Sheets

(51) Int. Cl.
| | |
|---|---|
| *H04N 21/434* | (2011.01) |
| *H04N 21/222* | (2011.01) |
| *H04N 21/462* | (2011.01) |
| *H04N 21/235* | (2011.01) |
| *H04N 21/482* | (2011.01) |
| *H04N 21/61* | (2011.01) |
| *H04N 21/633* | (2011.01) |
| *H04N 21/637* | (2011.01) |
| *H04N 21/643* | (2011.01) |
| *H04N 21/8545* | (2011.01) |
| *H04N 21/858* | (2011.01) |
| *H04H 20/93* | (2008.01) |
| *H04H 60/13* | (2008.01) |

(52) U.S. Cl.
CPC ......... *H04N 21/222* (2013.01); *H04N 21/235* (2013.01); *H04N 21/435* (2013.01); *H04N 21/4345* (2013.01); *H04N 21/4348* (2013.01); *H04N 21/4622* (2013.01); *H04N 21/482* (2013.01); *H04N 21/6125* (2013.01); *H04N 21/633* (2013.01); *H04N 21/637* (2013.01); *H04N 21/64322* (2013.01); *H04N 21/8545* (2013.01); *H04N 21/8586* (2013.01)

(58) Field of Classification Search
CPC ........... H04N 21/637; H04N 21/64322; H04N 21/8545; H04N 21/8586
See application file for complete search history.

(56) References Cited

U.S. PATENT DOCUMENTS

| | | |
|---|---|---|
| 2014/0059006 A1 | 2/2014 | Holden et al. |
| 2014/0059116 A1 | 2/2014 | Oh |

FOREIGN PATENT DOCUMENTS

| | | |
|---|---|---|
| WO | WO 2013/043000 A1 | 3/2013 |
| WO | WO 2013/094506 A1 | 6/2013 |

| SPD | | |
|---|---|---|
| Element/Attribute(with@) | Cardinality | Description |
| Spd | 1 | Service parameter description |
| @serviceId | 1 | service identifier (major+minor) |
| @spIndicator | 0..1 | Service protection off/on |
| ProtocolVersionDescription | 0..1 | Data transmission protocol type&version |
| NRTServiceDescription | 0..1 | NRT service configuration |
| CapabilityDescription | 0..1 | Receiver capability to be required |
| IconDescription | 0..1 | Icon location for NRT service |
| ISO639LanguageDescription | 0..1 | Language for NRT service |
| ReceiverTargetingDescription | 0..1 | Targeting information |
| AssociatedServiceDescription | 0..1 | Pointer to its associated service |
| ContentAdvisoryDescription | 1 | Rating information |
| Component | 1..n | Component signal (Elementary Stream) |
| @componentId | 1 | Component identification (Identical to representation id of MPD) |
| @representationId | 0..1 | MPD representation @id |
| @subRepresentationLevel | 0..1 | MPD sub-representation @level |
| @compoonentCategory | 1 | Component category "video", "audio", "caption", "nrt" |
| @locationType | 0..1 | Component Location type "bb", "bca", "bco" |
| @componentEncription | 0..1 | Component level encryption "on", "off" |
| TargetedDevice | 0..n | Target device indication <Under study> |
| ContentAdvisoryDescription | 0..1 | Rating information |
| AVCVideoDescription | 0..1 | Video parameters in case of AVC |
| HEVCVideoDescription | 0..1 | Video parameters in case of HEVC |
| AMPEG4AACAudioDescription | 0..1 | Audio parameters in case of MPEG4-AAC |
| AC3AudioDescription | 0..1 | Audio parameters in case of AC3 |
| CaptionDescription | 0..1 | Closed Caption parameters |

FIG.12

NRT Service Description element

| Element/Attribute (with@) | Cardinality | Description |
|---|---|---|
| NRTServiceDescription | | |
| @ConsumptionModel | 1 | NRT Consumption model "B&D", "push", "portal", "triggered" "scripted" |
| @autoUpdate | 0..1 | Auto-updated service or not "on", "off" |
| @storageReservation | 0..1 | Required storage size (Kbytes) |
| @defaultContentSize | 0..1 | Default NRT content size (bytes) |
| @entryURL | 0..1 | EntryURL |

FIG.13

RECEPTION APPARATUS, RECEPTION METHOD, TRANSMISSION APPARATUS AND TRANSMISSION METHOD

CROSS REFERENCE TO RELATED APPLICATIONS

This application is a continuation application of U.S. application Ser. No. 15/311,643, filed Nov. 16, 2016, which is U.S. National Phase of International Patent Application No. PCT/JP2015/064672 filed on May 22, 2015, which claims priority benefit of Japanese Patent Application No. JP 2014-112071 filed in the Japan Patent Office on May 30, 2014. The entire contents of the above-noted applications are incorporated herein by reference.

TECHNICAL FIELD

The present technology relates to a reception apparatus, a reception method, a transmission apparatus and a transmission method, and in particular to a reception apparatus, a reception method, a transmission apparatus and a transmission method in which NRT service is provided in digital broadcasting using an IP transmission method.

BACKGROUND ART

As a transmission method of a digital broadcasting standard in every country, an MPEG2-TS (Moving Picture Experts Group phase 2-Transport Stream) method is adopted (for example, see Patent Document 1). In the future, it assumes that enhanced service is provided by introducing an IP transmission method that uses an IP (Internet Protocol) packet used in a communication field for digital broadcasting.

Patent Document 1: Japanese Patent Application Laid-open No. 2012-156712

SUMMARY OF INVENTION

Problem to be Solved by the Invention

In digital broadcasting adopting the MPEG2-TS method, NRT (Non Real Time) service is known as broadcasting service where real-time viewing and listening is not requisite. There is a need to realize the NRT service in digital broadcasting using an IP transmission method. However, there is no established technical method to realize the NRT service in digital broadcasting using the IP transmission method.

The present technology is made in view of the circumstances. An object is to provide NRT service in digital broadcasting using an IP transmission method.

Means for Solving the Problem

A reception apparatus according to a first aspect of the present technology includes a channel selection control unit that performs a channel selection control of channel-selecting digital broadcasting using an IP (Internet Protocol) transmission method, an acquisition control unit that controls acquisition of an application delivered through broadcasting or communication in the digital broadcasting based on signaling information transmitted at a layer higher than an IP layer in a protocol layer of the IP transmission method, and an application execution unit that executes the application acquired.

The application may be executed in conjunction with an AV content provided as broadcasting service in the digital broadcasting.

The application may be provided as service same as or different from the broadcasting service.

The acquisition control unit may control acquisition of the application based on control information of the application delivered through broadcasting or communication and the signaling information when trigger information for starting the application transmitted through the digital broadcasting is extracted.

The application may be configured of a plurality of components, and the acquisition control unit may control acquisition of the plurality of components delivered through broadcasting or communication.

The signaling information may include information for acquiring signaling information of another service when the application is provided as the another service.

The application may be provided as independent broadcasting service in the digital broadcasting.

The application may be configured of an entry point and one or a plurality of resources, and the acquisition control unit may control acquisition of the one or plurality of resources delivered through broadcasting or communication based on a URL (Uniform Resource Locator) of the one or plurality of resources included in the entry point and the signaling information.

The signaling information may include a URL of the entry point, and the acquisition control unit mat acquire the entry point based on the URL of the entry point.

The reception apparatus may be an independent apparatus, or may be an internal block configuring one apparatus.

A reception method according to a first aspect of the present technology is a reception method corresponding to the reception apparatus according to the first aspect of the present technology.

In the reception apparatus and the reception method according to the first aspect of the present technology, a channel selection control to channel-select digital broadcasting using an IP transmission method is performed, acquisition of an application delivered through broadcasting or communication in the digital broadcasting is controlled based on signaling information transmitted at a layer higher than an IP layer in a protocol layer of the IP transmission method, and the application acquired is executed.

A transmission apparatus according to a second aspect of the present technology includes an acquisition unit that acquires a stream provided as broadcasting service, a signaling information generation unit that generates signaling information including control information used in an acquisition control of an application delivered through broadcasting or communication, and a transmission unit that transmits the signaling information generated together with the stream in a broadcasting wave of digital broadcasting using an IP transmission method, the signaling information being transmitted at a layer higher than an IP layer in a protocol layer of the IP transmission method in the digital broadcasting.

The application may be executed in conjunction with an AV content provided as broadcasting service in the digital broadcasting.

The application may be provided as service same as or different from the broadcasting service.

The signaling information may include information for acquiring signaling information of another service when the application is provided as the another service.

The application may be provided as independent broadcasting service in the digital broadcasting.

The application may be configured of an entry point and one or a plurality of resources, and the entry point may include a URL of the one or plurality of resources.

The signaling information may include the URL of the entry point.

The transmission apparatus may further include an application generation unit that generates the application, and the transmission unit may transmit the application generated as the stream.

The transmission apparatus may further include a trigger information generation unit that generates trigger information starting the application, and the transmission unit may transmit the trigger information included in the stream.

The reception apparatus may be an independent apparatus, or may be an internal block configuring one apparatus.

A reception method according to a second aspect of the present technology is a reception method corresponding to the reception apparatus according to the second aspect of the present technology.

In the reception apparatus and the reception method according to the second aspect of the present technology, a stream provided as broadcasting service is acquired, signaling information including control information used in an acquisition control of an application delivered through broadcasting or communication is generated, and the signaling information generated together with the stream in a broadcasting wave of digital broadcasting using an IP transmission method is transmitted. The signaling information is transmitted at a layer higher than an IP layer in a protocol layer of the IP transmission method in the digital broadcasting.

Effects of the Invention

According to the first aspect and the second aspect of the present technology, the NRT service can be provided in the digital broadcasting using the IP transmission method.

Effects described herein are not limited only to be illustrative, there may be effects other than those described herein.

BRIEF DESCRIPTION OF DRAWINGS

FIG. 12 is a diagram showing an example of SPD syntax.

FIG. 13 is a diagram showing an example of NRT Service Description element syntax.

MODES FOR CARRYING OUT THE INVENTION

Figure 1:
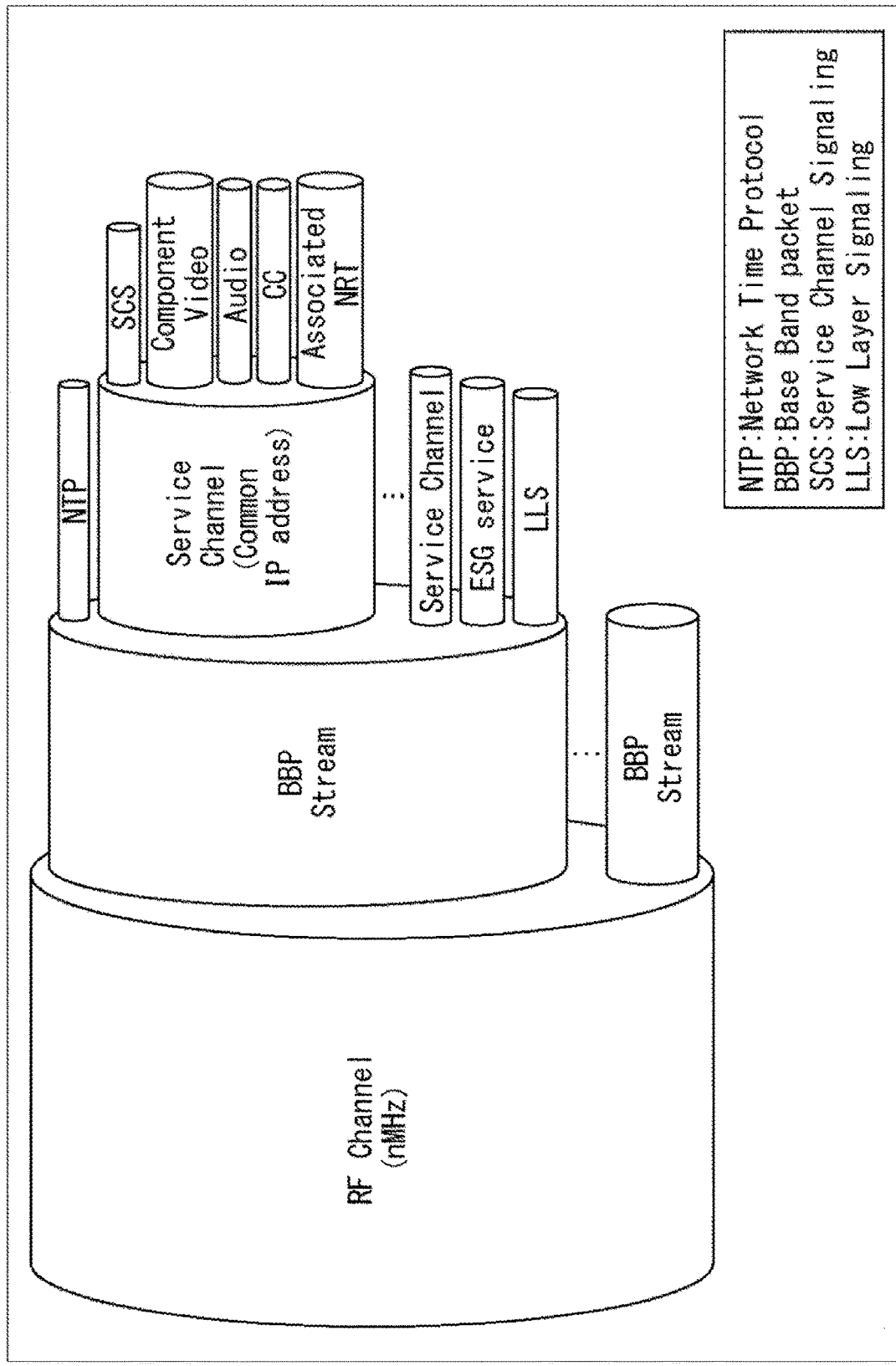
FIG. 1 is a diagram showing an associated NRT system pipe model.

Hereinafter, referring to the drawings, embodiments of the present technology will be described. The description will be made in the following order.

1. Overview of NRT Service in IP Transmission Method
(1) Associated NRT
(2) Stand-alone NRT
2. Operation Examples of NRT service (1-1) Operation Example 1 of Associated NRT: TPT (acquired through broadcasting), TDO (acquired through broadcasting from main service) (1-2) Operation Example 2 of Associated NRT: TPT (acquired through broadcasting), TDO (acquired through broadcasting from NRT service) (1-3) Operation Example 3 of Associated NRT: TPT (acquired through communication), TDO (acquired through broadcasting from NRT service) (1-4) Operation Example 4 of Associated NRT: TPT (acquired through communication), TDO (acquired through broadcasting and communication)
(2-1) Operation Example 1 of Stand-alone NRT
3. Syntax
4. System Configuration
5. Processing Flow in each Apparatus
6. Configuration of Computer 1. Overview of NRT Service in IP Transmission Method NRT (Non Real Time) service is broadcasting service that does not assume real-time viewing and listening. In the NRT service, a FLUTE (File Delivery over Unidirectional Transport) session is used to transmit NRT contents, for example. The NRT service is classified into two types: associated NRT (Associated NRT) and stand-alone NRT (Stand-alone NRT).

The associated NRT is provided as an application that is accompanied (conjunction) by main broadcasting service for providing a video and audio stream (hereinafter referred to as "the main service"). In the associated NRT, DO (Declarative Object) is started as an application from trigger information buried into the stream such as video and audio, captions, etc. of the main service.

As the DO is started by the trigger information, it is called as a TDO (Triggered Declarative Object). The TDO is acquired according to TPT (TDO Parameter Table) provided from the trigger information, and an action of the TDO is controlled. Hereinafter, the TDO is referred to as a TDO application.

The stand-alone NRT is provided as an application in independent broadcasting service. In the stand-alone NRT, when broadcasting service is selected by user's manipulation such as a remote controller, a DO (Declarative Object) is started as an application.

As the DO is a general-purpose DO (DO that is not started by the trigger information), it is called as an NDO (NRT Declarative Object). The NDO is acquired by connecting to the stream of the NRT service of the stand-alone NRT according to channel selection information acquired in advance similar to general broadcasting service, and an action thereof is controlled. Hereinafter, the NDO is referred to as an NDO application.

(1) Associated NRT (System Pipe Model)

FIG. 1 is a diagram showing a system pipe model of the associated NRT.

In FIG. 1, a plurality of BBP (Base Band Packet) streams are transmitted to a broadcast wave (RF Channel) having a predetermined frequency band. Each BBP stream includes an NTP (Network Time Protocol), a plurality of service channels (Service Channel), ESG (Electronic Service Guide) service and LLS (Low Layer Signaling). Although the NTP, the service channel and the ESG service are transmitted according to the protocol of an UDP/IP (User Datagram Protocol/Internet Protocol), the LLS is transmitted on the BBP stream.

The NTP is time information. The ESG service is an electronic service guide. The LLS is low layer signaling information. For example, as the LLS, SCD (Service Configuration Description), EAD (Emergency Alerting Description), RRD (Region Rating Description) and the like are transmitted.

In the SCD, a BBP stream configuration and a service configuration in a broadcasting network are shown by an ID system corresponding to an MPEG2-TS method. Also, the SCD includes information such as an IP address as attribute and setting information per service, bootstrap information for accessing the ESG service and the SCS and the like.

The EAD includes information about an urgent notice. The RRD includes rating information. The SCD, the EAD and the RRD are described, for example, by a markup language such as XML (Extensible Markup Language).

The service channel (hereinafter referred to as "service") is configured of SCS (Service Channel Signaling), a component (Component) such as video, audio and captions that configures a program, and the associated NRT. A common IP address is added to an element that configures each service. Using the IP address, the component and the SCS can be packaged per service.

The SCS is signaling information per service. For example, as the SCS, USD (User Service Description), MPD (Media Presentation Description), SDP (Session Description Protocol), FDD (File Delivery Description), SPD (Service Parameter Description), TPT (TDO Parameter Table) and the like are transmitted.

The USD includes reference information for referring the signaling information such as the MPD, the FDD, the SDP and the like. The USD may be referred to as USBD (User Service Bundle Description) in some cases. The MPD includes information such as a segment URL (Uniform Resource Locator) per stream (component) transmitted per service. The MPD is corresponding to a standard of MPEG-DASH (Moving Picture Expert Group-Dynamic Adaptive Streaming over HTTP). The SDP includes a service attribute per service, configuration information and attributes of a stream, filter information, location information and the like.

The FDD includes location information (e.g., URL), TOI (Transport Object Identifier) and the like as index information per TSI (Transport Session Identifier). Here, in a FLUTE session, a file to be transmitted is administered by TOI as one object. Also, an aggregation of a plurality of objects is administered by TSI as one session. In other words, in the FLUTE session, a specific file can be specified by two identification information items of TSI and TOI. The FDD may be included in the USD as an element.

The SPD is configured by including a variety of parameters designated in a service or component level. The TPT includes the control information for controlling the TDO application. The USD, the MPD, the SDP, the FDD, the SPD and the TPT are described by the markup language such as XML, for example.

The associated NRT (Associated NRT) provides a TDO application that is executed accompanied (conjunction) by the main service. The TDO application may be configured of a plurality of components, in some cases. Also, the associated NRT may be provided by the same service as the main service, and may be provided by different service (NRT service) from the main service.

Here, an RF channel ID (RF channel id) is assigned to a broadcasting wave (RF Channel) having a predetermined frequency band per broadcasting carrier, for example. Also, the BBP stream ID (BBP_stream_id) is assigned to one or a plurality of BBP streams transmitted through each broadcasting wave. Furthermore, a service ID (service_id) is assigned to one or a plurality of services transmitted through each BBP stream.

Thus, a configuration corresponding to a combination (hereinafter referred to as "triplet (Triplet)") of a network ID (network_id), a transport stream ID (transport_stream_id) and the service ID (service_id) used in the MPEG2-TS method is adopted as the ID system of the IP transmission method. By the triplet, the BBP stream configuration and a service configuration in the broadcasting network are shown.

Using the ID system, a matching with MPEG2-TS method widely spread at present is possible. In the ID system of the IP transmission method, the RF channel ID and the BBP stream ID correspond to the network ID and the transport stream ID in the MPEG2-TS method.

Execution Example 1 of TDO Application

Figure 2:
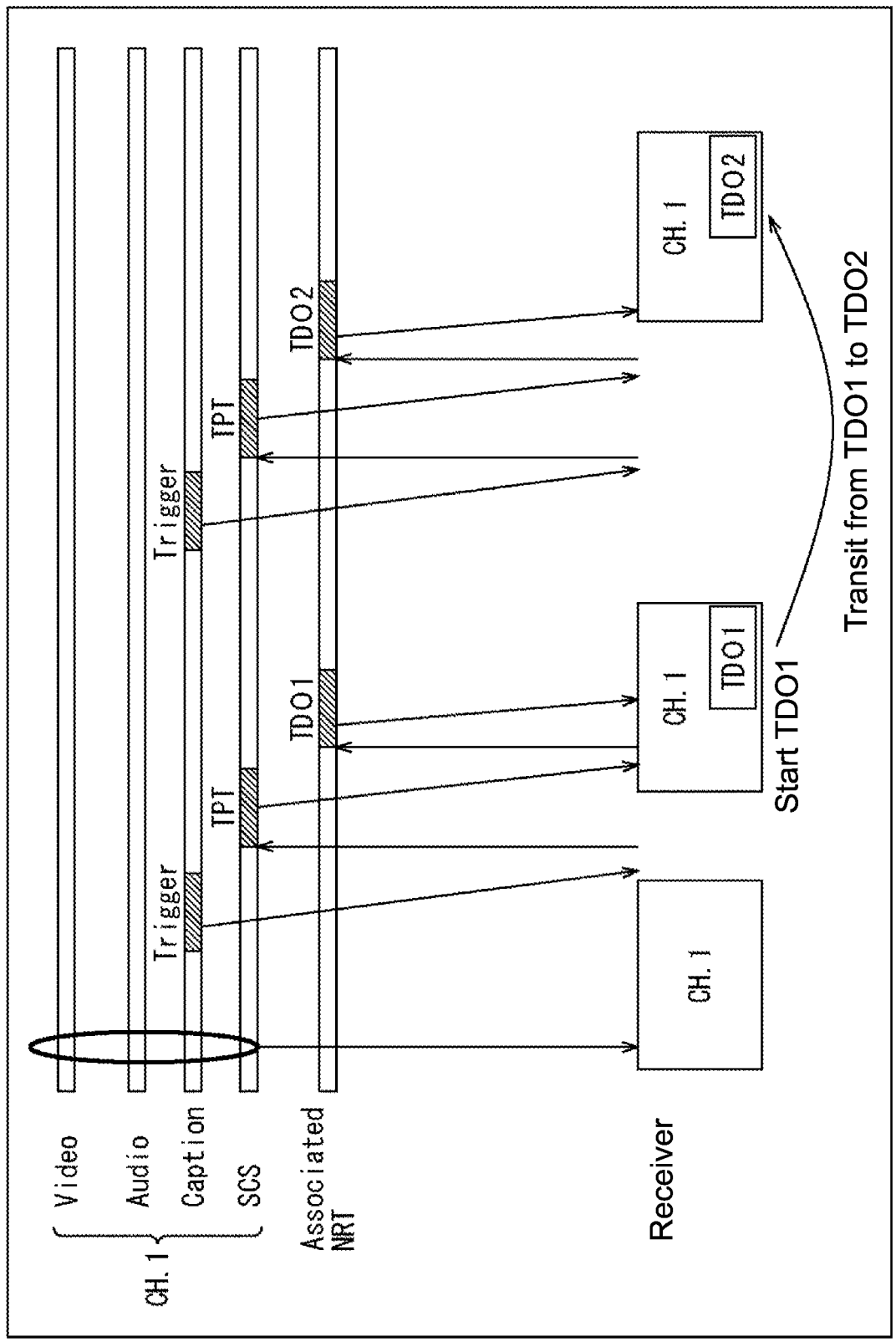
FIG. 2 is a diagram showing an execution example of a TDO application when a TPT is acquired through broadcasting.

FIG. 2 is a diagram showing an execution example of a TDO application when a TPT is acquired through broadcasting.

In FIG. 2, a transmitter of a broadcasting station (broadcasting carrier) transmits the BBP stream by the broadcasting wave of the digital broadcasting using the IP transmission method. In the BBP streams, the SCS and the components configuring the main service of stream channel 1 (CH. 1) are transmitted as streams. Also, as the associated NRT accompanied by the main service, the TDO application is transmitted. The TDO application is provided by the same service as the main service of the channel 1, or is provided by different NRT service from the main service.

At a receiver installed in each home, when the channel 1 is channel-selected, the SCS configuring the channel 1 and the components such as video, audio and captions are acquired to reproduce a video image and voice of the channel 1 is reproduced.

The trigger information included in a stream such as captions is extracted, the receiver acquires the TPT transmitted through the SCS. The receiver analyses the signaling information (SCS) such as the TPT and the USD, thereby acquiring the TDO application transmitted through broadcasting or communication. In this embodiment, TDO1 transmitted through broadcasting is acquired and started. As a result, in the receiver, the video image of the TDO1 is superimposed with the video image in the channel 1.

Thereafter, in the receiver, the trigger information included in the stream such as captions is extracted, the receiver acquires the TPT transmitted through the SCS. The receiver analyses the signaling information (SCS) such as the TPT and the USD, thereby acquiring the TDO2 transmitted through broadcasting. As a result, in the receiver, the TDO application superimposed with the video image of the channel 1 transits from the TDO1 to the TDO2.

As described above, in the associated NRT, the TDO application is acquired via a delivery path of either of broadcasting and communication, and is started by using the trigger information and the TPT.

Execution Example 2 of TDO Application

Figure 3:
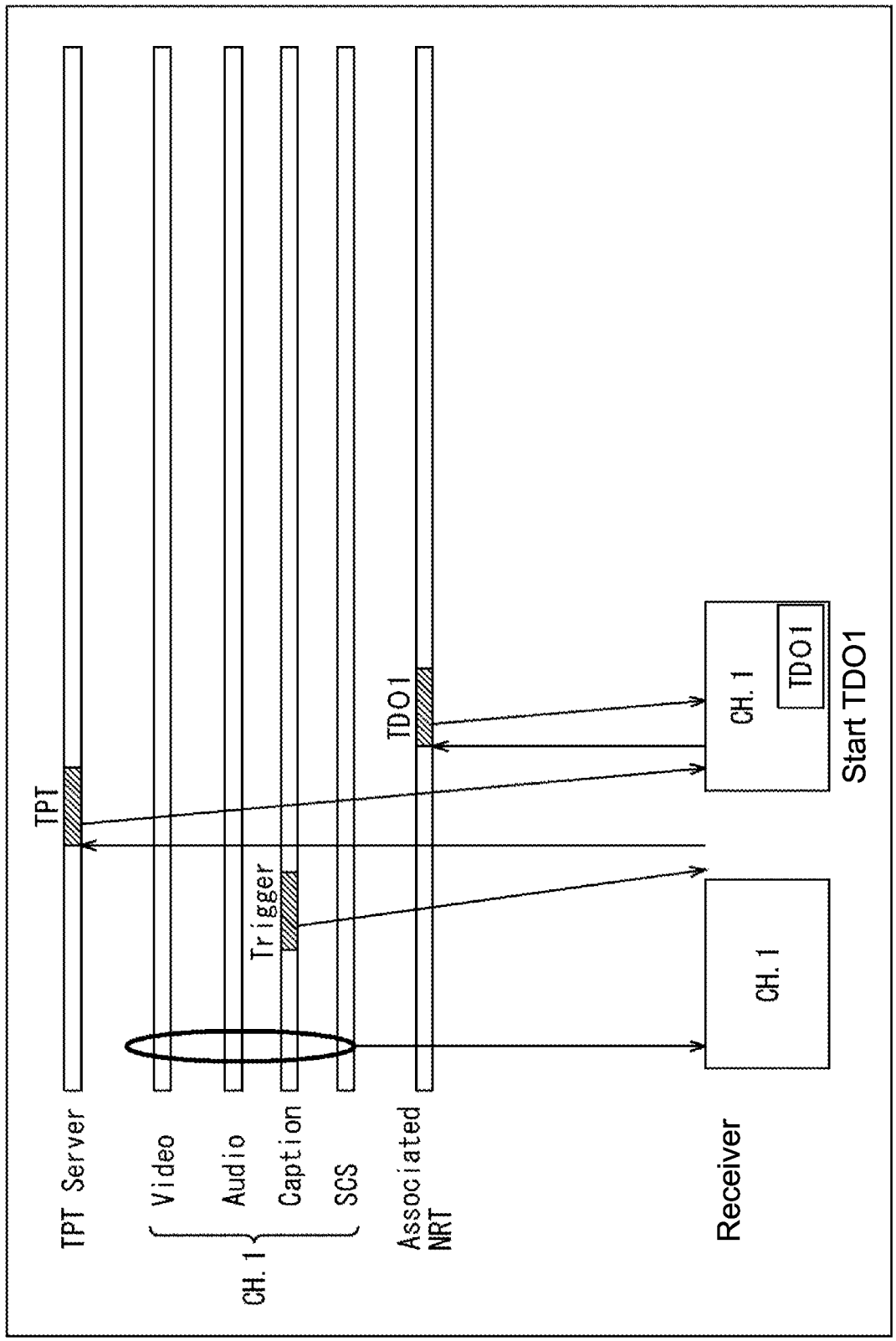
FIG. 3 is a diagram showing an execution example of a TDO application when a TPT is acquired through communication.

FIG. 3 is a diagram showing an execution example of the TDO application when the TPT is acquired through communication. That is to say, although FIG. 2 shows the case that the TPT is transmitted through broadcasting, the TPT may be transmitted through communication, as shown in FIG. 3.

In FIG. 3, the transmitter of the broadcasting station transmits the BBP stream by the broadcasting wave of the digital broadcasting using the IP transmission method. In the BBP stream, the SCS and the components configuring the main service of the channel 1 (CH. 1) are transmitted as the streams. Also, the TDO application is transmitted as the associated NRT accompanied by the main service.

At a receiver installed in each home, when the channel 1 is channel-selected, the SCS configuring the channel 1 and the components such as video, audio and captions are acquired to reproduce a video image and voice of the channel 1.

When the receiver extracts the trigger information included in a stream such as captions, the receiver accesses a TPT server (TPT Server) via the internet according to the URL included in the trigger information, and acquires the TPT. The receiver analyses the signaling information (SCS) such as the TPT and the USD, acquires the TDO1 transmitted through broadcasting, and starts the TDO1. As a result, in the receiver, the video image of the TDO1 is superimposed with the video image in the channel 1.

As above, in the associated NRT, the TPT that is the control information of the TDO application is acquired via a delivery path of either of broadcasting and communication. Although the embodiments shown in FIGS. 2 and 3 show the case that the TDO application is transmitted through broadcasting, the TDO application may be delivered from an application server (not shown) via the internet through communication.

(2) Stand-Alone NRT
(System Pipe Model)

Figure 4:
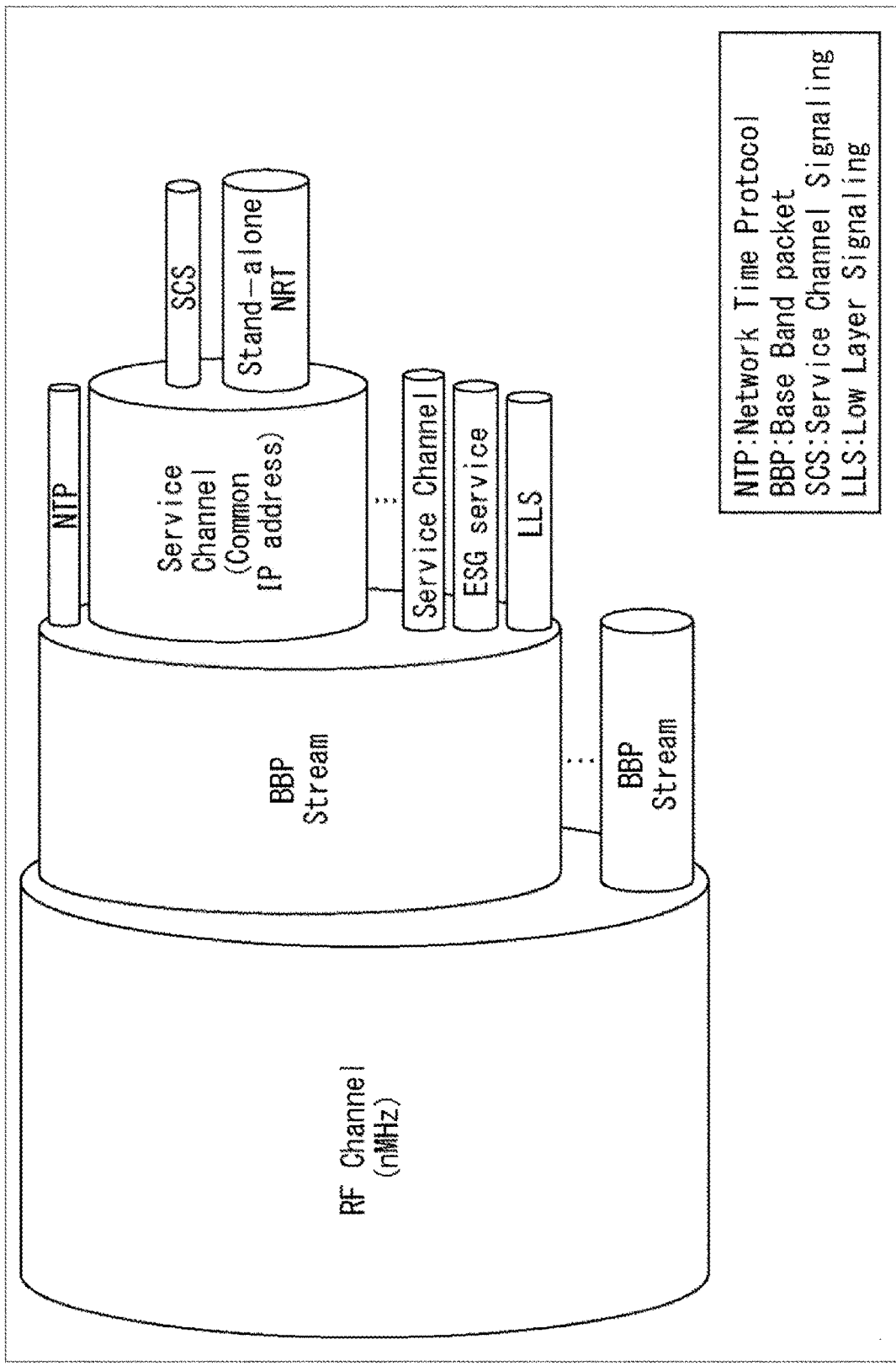
FIG. 4 is a diagram showing a system pipe model of a stand-alone NRT.

FIG. 4 is a diagram showing a system pipe model of a stand-alone NRT.

In FIG. 4, in the broadcasting wave (RF Channel) having a predetermined frequency band, a plurality of BBP streams are transmitted. Also, in each BBP stream, NTP, a plurality of service channels, the ESG service and the LLS are transmitted. While the NTP, the service channels and the ESG service are transmitted according to the protocol of the UDP/IP, the LLS is transmitted on the BBP stream.

The LLS is low layer signaling information, and transmits, for example, the SCD, the EAD and the RRD. The service channel (service) is configured of the SCS and the stand-alone NRT. The SCS is signaling information per service, and transmits the USD, the SDP, the FDD, the SPD and the like.

The stand-alone NRT (Stand-alone NRT) provides an NDO application executed as independent broadcasting service. In other words, as stand-alone NRT is independent broadcasting service, no stream of other components such as video, audio and captions is present within the same service. Also, the NDO application is configured, for example, of an NRT entry point (e.g., index.html) and an NRT resource. In the receiver, the NRT entry point is acquired firstly, thereby acquiring the NRT resource depending on a description content of the NRT entry point.

In the system pipe model of the stand-alone NRT in FIG. 4, similar to the system pipe model of the associated NRT in FIG. 1, the RF channel ID, the BBP stream ID and the service ID are assigned. By the triplet, the BBP stream configuration and a service configuration in the broadcasting network are shown. As described above, the ID system corresponds to the ID system of the MPEG2-TS method.

Execution Example of NDO Application

Figure 5:
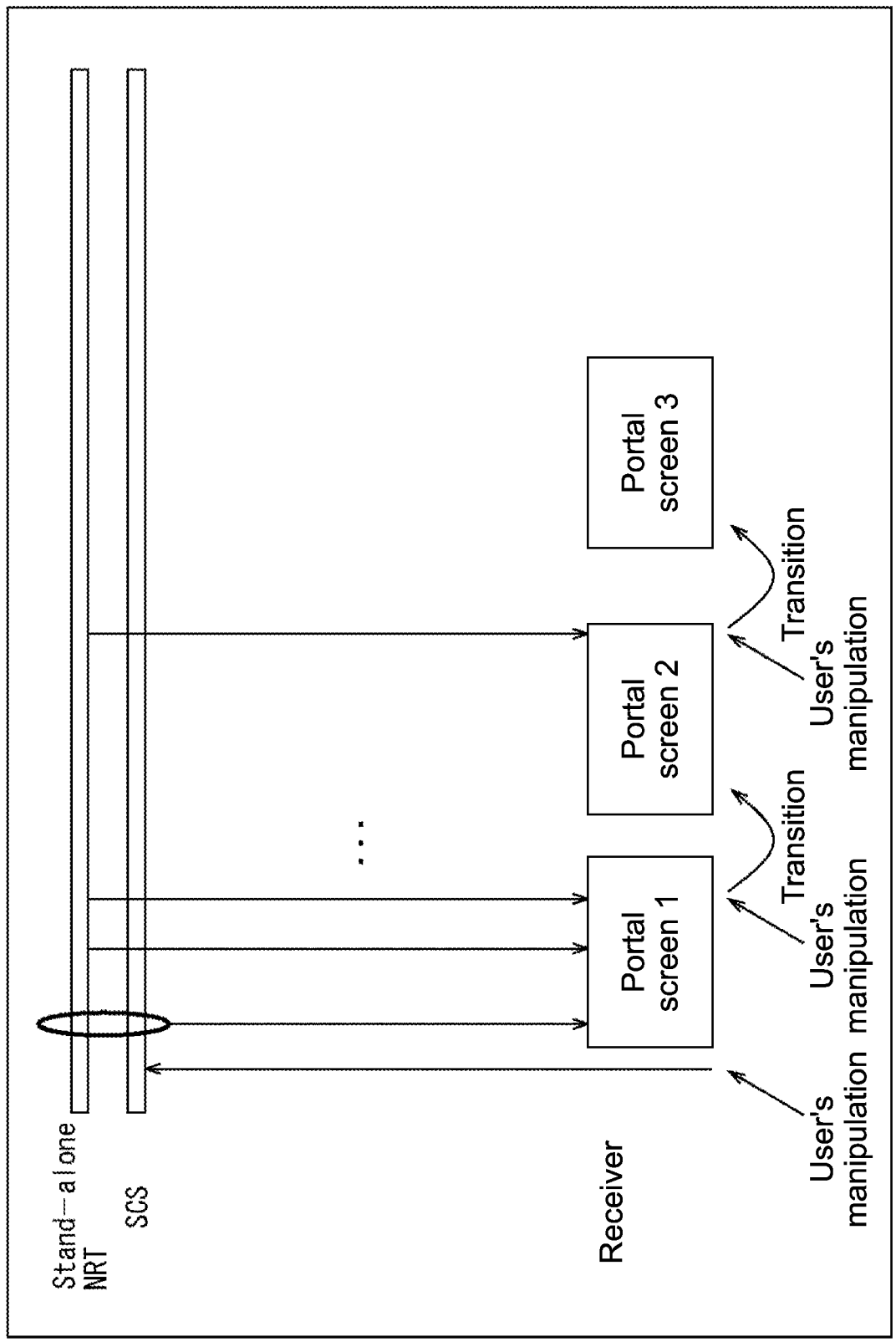
FIG. 5 is a diagram showing an execution example of an NDO application.

FIG. 5 is a diagram showing an execution example of an NDO application.

In FIG. 5, the transmitter of the broadcasting station (broadcasting carrier) transmits the BBP stream by the broadcasting wave of the digital broadcasting using the IP transmission method. In the BBP stream, the stream and the SCS of the stand-alone NRT are transmitted.

At a receiver installed in each home, when portal service is selected, the SCS is acquired. The receiver analyses signaling information (SCS) such as the USD, the SPD, the FDD, the SDP and the like, and acquires the NRT entry point (e.g., index.html) transmitted through broadcasting.

Also, the receiver acquires the NRT resource transmitted through broadcasting or communication based on the URL of the NRT resource listed in the NRT entry point and the signaling information (SCS). In this embodiment, the NRT resource transmitted through broadcasting is acquired. As a result, in the receiver, a screen 1 of the portal service corresponding to the NDO application is displayed.

Thereafter, in the receiver, depending on the user's manipulation, the NRT resource transmitted through broadcasting is acquired. In this way, the screen of the portal service transits from the screen 1 to a screen 2 and furthermore the screen 2 to a screen 3.

As above, in the stand-alone NRT, the NDO application is acquired via a delivery path of either of broadcasting and communication, and is executed as independent broadcasting service (portal service) regardless of the main service.

2. Operation Example of NRT Service (Operation Example of Basic Service)

Figure 6:
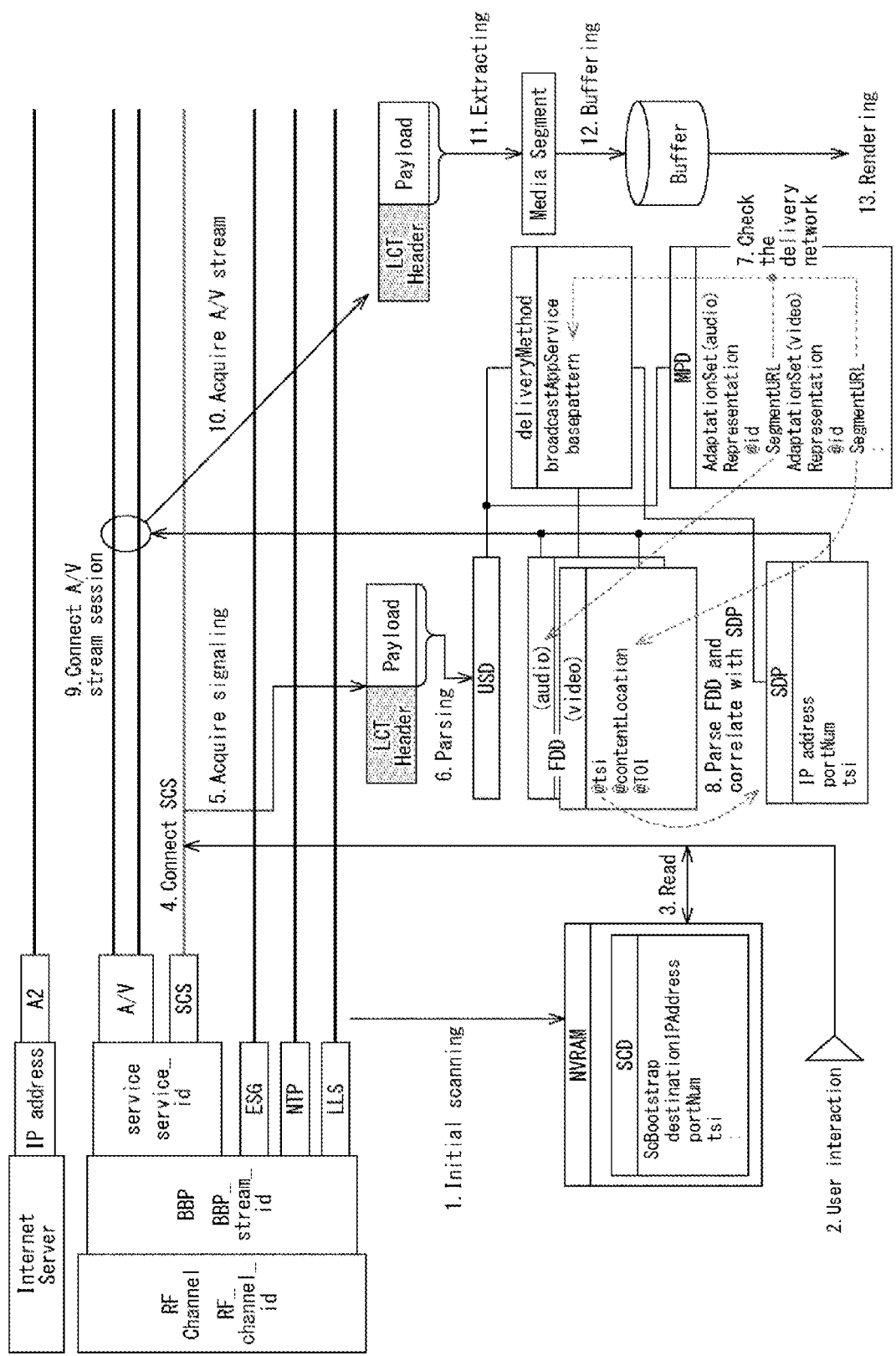
FIG. 6 is a diagram showing an operation example of basic service.

FIG. 6 is a diagram showing an operation example of basic service common to each operation example of the associated NRT. In the figure, numerals "1" to "13" represent a sequence of processing (hereinafter referred to as "procedure"). In the receiver, processing is executed in the numeral order. Also, the numbers have the same meaning in other drawings as described later.

In FIG. 6, the transmitter of the broadcasting station (broadcasting carrier) identified by the RF channel ID transmits the BBP stream (BBP Stream) identified by the BBP stream ID by the broadcasting wave (RF channel) of the digital broadcasting using the IP transmission method. In the BBP stream, the stream, the signaling information and the like of the components configuring each service identified by the service ID are transmitted.

Files of the stream of audio or video and the signaling information (SCS) are transmitted through the FLUTE session. In the operation example of the basic service in FIG. 6, since only the stream transmitted through broadcasting is acquired, no stream transmitted through communication from the internet server (Internet Server) is acquired.

In FIG. 6, the receiver installed in each home acquires the SCD transmitted through the LLS by initial scanning processing, and saves the SCD to a NVRAM (procedure 1). The SCD includes SCS Bootstrap information where the IP address, a port number and the TSI for acquiring the SCS are described. Here, when a user channel-selects desired service (procedure 2), the receiver reads the SCD from the NVRAM (procedure 3), connects to the SCS transmitted through the broadcasting wave according to the SCS Bootstrap information, and acquires the SCS (procedures 4 and 5).

Since the files of the SCS are transmitted through the FLUTE session, by analyzing data stored in the LCT packet, the signaling information such as the USD, the MPD, the SDP, the FDD, or the like is acquired (procedure 6). Although the delivery Method element is a subelement of the USD, it is shown separately from the USD, as a matter of explanation convenience. Also, the reference information is described in the USD. Using the reference information, the MPD, the SDP and the FDD are acquired. As the signaling information is entirely included in the SCS, they can be acquired at once.

In the AdaptationSet element per component of the MPD, a Representation element is disposed, and the streams transmitted through broadcasting or communication are listed. Also, to the Representation element, a SegmentURL element that specifies the URL of an acquisition source of the stream are described other than the id attribute. In addition, in the deliveryMethod element of USD, information for identifying the delivery path of the stream is specified.

In the operation example of the basic service in FIG. 6, as the stream is transmitted only through broadcasting, the broadcastAppService element is disposed in the deliveryMethod element, and the URL of the stream transmitted through broadcasting is identified in the basepattern element. Then, by matching the URL (SegmentURL) specified in the SegmentURL element of the MPD with the URL specified in the basepattern element of the deliveryMethod element of the USD, it can specify that the audio or video stream listed in the MPD is transmitted through broadcasting (procedure 7).

To the FDD, a tsi attribute, a contentLocation attribute and a toi attribute are described per audio or video stream. As the tsi attribute, TSI (Transport Session Identifier) that is identification information of each FLUTE session is specified. Also, as the toi attribute, TOI (Transport Object Identifier) that is identification information of a plurality of objects transmitted per FLUTE session is specified. As the contentLocation attribute, the URL of the file is specified.

Then, by matching the URL (SegmentURL) specified in the SegmentURL element of the MPD with the URL specified in the contentLocation attribute of the FDD, the TSI and the TOI for acquiring the audio or video stream listed in the MPD are specified (procedure 8). Furthermore, by referring to the SDP, the IP address and the port number for acquiring the audio or video stream are specified (procedure 8).

In this manner, the IP address, the port number, the TSI and the TOI for acquiring the audio or video stream are acquired. The receiver connects to the audio or video stream transmitted through the FLUTE session to acquire the LCT packet using the IP address, the port number, the TSI and the TOI for acquiring the audio or video stream (procedures 9 and 10).

Then, the receiver extracts the segment data (media segment) stored in the LCT packet, and stores the segment data temporally in a buffer, thereby performing buffering (procedures 11 and 12), and further performing rendering (procedure 13). In this manner, in the receiver, video image and voice corresponding to the service channel-selected are reproduced.

(1-1) Operation Example 1 of Associated NRT

Figure 7:
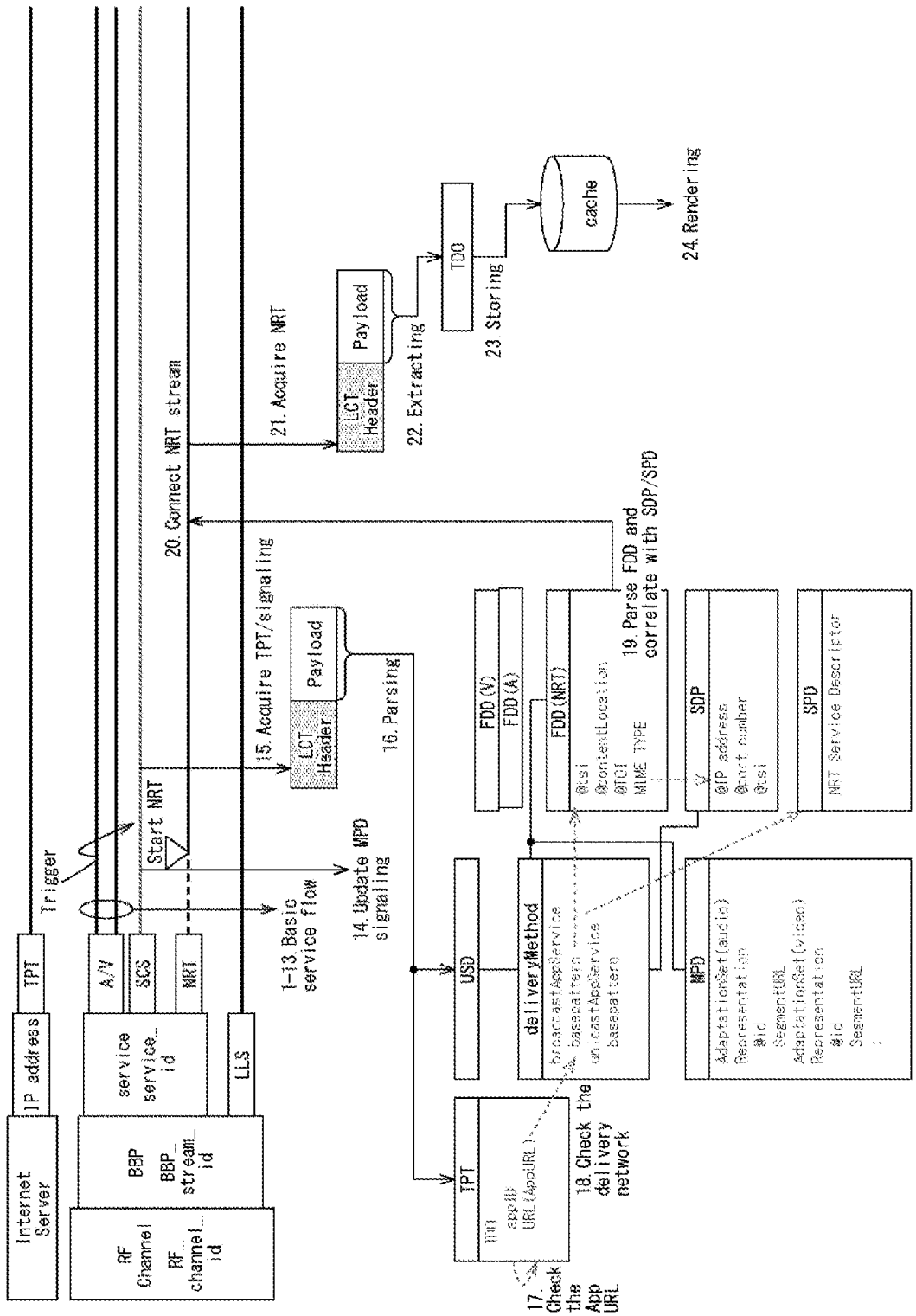
FIG. 7 is a diagram for explaining an operation example 1 of an associated NRT.

FIG. 7 is a diagram for explaining an operation example 1 of the associated NRT. In the operation example 1, the TPT is acquired through broadcasting, and the TDO application is acquired through broadcasting from the stream of the associated NRT transmitted as the same service as the main service.

In FIG. 7, the transmitter of the broadcasting station identified by the RF channel ID transmits the BBP stream (BBP Stream) identified by the BBP stream ID by the broadcasting wave (RF Channel) of the digital broadcasting using the IP transmission method.

In the BBP stream, the audio or video stream ("A/V" in the figure) and the SCS are transmitted as the main service identified by the service ID together with the LLS. Also, as the same service (same IP address) as the main service, a stream of the associated NRT ("NRT" in the figure) is transmitted. Into the audio or video stream, the trigger information is buried. In addition, the TPT is transmitted through the SCS.

The stream of audio, video, and the associated NRT and the file of the signaling information (SCS) are transmitted through the FLUTE session. In the operation example 1 of the associated NRT, as the TPT transmitted through broadcasting is acquired, the TPT transmitted through communication from the internet server (TPT server) is not acquired.

In FIG. 7, the receiver installed in each home reproduces a video image and voice of a broadcasting program of the main service channel-selected by the user by executing procedure 1 to procedure 13 in the operation example (Basic Service flow) of the basic service in FIG. 6.

In the operation example 1 of the associated NRT in FIG. 7, the associated NRT is provided as compared with the operation example of the basic service in FIG. 6, at the time when provision of the associated NRT is started, description of the signaling information (SCS) corresponds to the associated NRT. The receiver always monitors updating of the MPD transmitted through the SCS, and reproduces the audio or video stream corresponding to the MPD (procedure 14).

The receiver always monitors the audio or video stream, connects to the SCS when the trigger information included in the stream is extracted, and acquires the SCS (procedure 15). Note that as the files such as the TPT and the USD are transmitted through the FLUTE session, the signaling information such as the TPT and the USD is acquired by analyzing the data stored in the LCT packet (procedure 16).

The timing to acquire the TPT is when the trigger information included in the stream is extracted. Alternatively, the TPT may be acquired at the timing when the TPT newly appears or when the TPT is updated, which is found by monitoring always the SCS, for example.

In the TPT, an ID (AppID) that identifies the TDO application and a URL (AppURL) that shows an acquisition source of the TDO application are described correspondingly. Here, as the AppURL of the TPT corresponds to the URL specified by the basepattern element within the broadcastAppService element of the deliveryMethod element of the USD, these URLs are matched, thereby specifying that the TDO application that is to be controlled by the TPT is transmitted through broadcasting (procedures 17 and 18).

Also, as the URL (AppURL of TPT) specified by the basepattern element of the deliveryMethod element of the USD corresponds to the URL specified by the contentLocation attribute of the FDD, these URLs are matched, thereby specifying the TSI and the TOI for acquiring the TDO application that is to be controlled by the TPT. In addition, by referring to the SDP, the IP address and the port number for acquiring the TDO application that is to be controlled by the TPT are specified (procedure 19).

An NRT related descriptor (NRT Service Descriptor) where information about the associated NRT is described disposed in the SPD, the information described therein may be referred, as appropriate.

In this manner, the IP address, the port number, the TSI and the TOI for connecting to the stream of the associated NRT are acquired. The receiver connects to the stream of the associated NRT transmitted through the FLUTE session to acquire the LCT packet using the IP address, the port number, the TSI and the TOI of the associated NRT (procedures 20 and 21).

As the stream of the associated NRT and the audio or video stream are provided as the same service, the IP address of the stream of the associated NRT is not acquired from the SDP, and may be the same as that of the audio or video stream.

Then, the receiver extracts and caches the data stored in the LCT packet (procedures 22 and 23), and further performs rendering (procedure 24). In this manner, in the receiver, the TDO application is executed with conjunction with the broadcasting program, and a video image of the TDO application is displayed on and superimposed with the video image of the broadcasting program.

As described above, the operation example 1 of the associated NRT in FIG. 7, when the stream of the associated NRT is transmitted as the same stream of the audio and the video, using the signaling information such as the TPT and the USD transmitted as the SCS, the TDO application is acquired from the stream of the associated NRT, and is executed in conjunction with the broadcasting program. In this manner, in the digital broadcasting using the IP transmission method, the NRT service of the associated NRT can be provided.

(1-2) Operation Example 2 of Associated NRT

Figure 8:
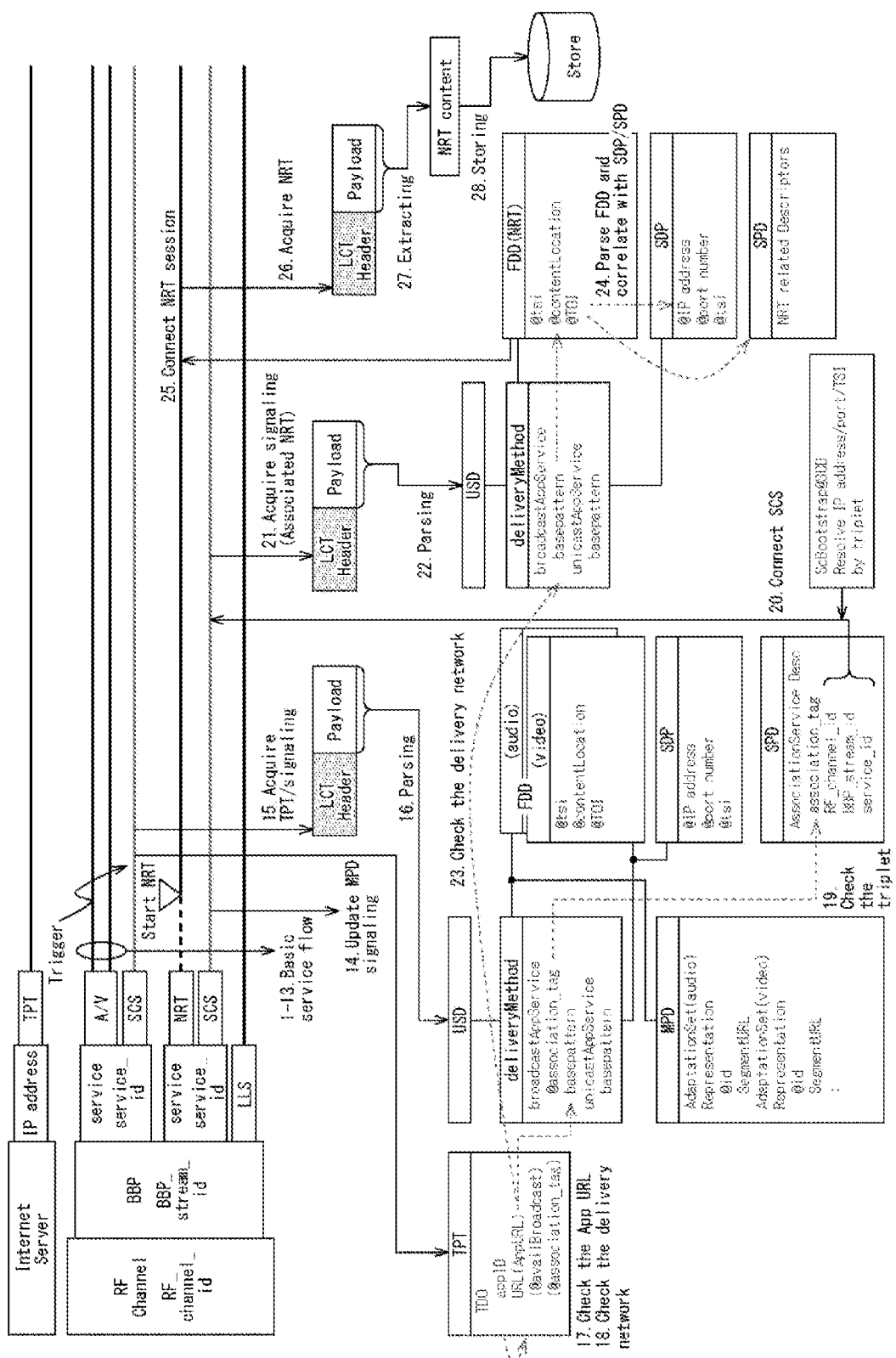
FIG. 8 is a diagram for explaining an operation example 2 of an associated NRT.

FIG. 8 is a diagram for explaining an operation example 2 of the associated NRT. In the operation example 2, the TPT is acquired through broadcasting, and the TDO application is acquired through broadcasting from the stream of the associated NRT transmitted as the different service from the main service.

In FIG. 8, the transmitter of the broadcasting station identified by the RF channel ID transmits the BBP stream (BBP Stream) identified by the BBP stream ID by the broadcasting wave (RF Channel) of the digital broadcasting using the IP transmission method.

In the BBP stream, the audio or video stream ("A/V" in the figure) and the SCS are transmitted as the main service identified by the service ID together with the LLS. Also, as the different service (NRT service) from the main service, a stream of the associated NRT ("NRT" in the figure) and the SCS are transmitted. In other words, in this case, the main service has a different IP address from the NRT service. Into the audio or video stream, the trigger information is buried. In addition, the TPT is transmitted through the SCS.

The stream of audio, video, and the associated NRT and the file of the signaling information (SCS) are transmitted through the FLUTE session. In the operation example 2 of the associated NRT, as the TPT transmitted through broadcasting is acquired, the TPT transmitted through communication from the internet server (TPT server) is not acquired.

In FIG. 8, the receiver installed in each home reproduces a video image and voice of a broadcasting program of the main service channel-selected by the user by executing procedure 1 to procedure 13 in the operation example (Basic Service flow) of the basic service in FIG. 6.

In the operation example 2 of the associated NRT in FIG. 8, the associated NRT is provided as compared with the operation example of the basic service in FIG. 6, at the time when provision of the associated NRT is started, description of the signaling information (SCS) corresponds to the associated NRT. The receiver always monitors updating of the MPD transmitted through the SCS, and reproduces the audio or video stream corresponding to the MPD (procedure 14).

The receiver always monitors the audio or video stream, connects to the SCS of the main service when the trigger information included in the stream is extracted, and acquires the SCS (procedure 15). Note that as the files such as the TPT and the USD are transmitted through the FLUTE session, the signaling information such as the TPT and the USD is acquired by analyzing the data stored in the LCT packet (procedure 16).

The timing to acquire the TPT is when the trigger information included in the stream is extracted. Alternatively, the TPT may be acquired at the timing when the TPT newly appears or when the TPT is updated, which is found by monitoring always the SCS of the main service, for example.

In the TPT, an ID (AppID) that identifies the TDO application and a URL (AppURL) that shows an acquisition source of the TDO application are described correspondingly. Here, as the AppURL of the TPT corresponds to the URL specified by the basepattern element within the broadcastAppService element of the deliveryMethod element of the USD, these URLs are matched, thereby specifying that the TDO application that is to be controlled by the TPT is transmitted through broadcasting (procedures 17 and 18). In the TPT in FIG. 8, it may specify whether or not the TDO application is transmitted through broadcasting by the availbroadcast attribute.

In addition, in the broadcastAppService element, an association tag attribute is described in addition to the basepattern element. As the association tag attribute is associated with the association tag attribute of the Association Service Description described in the SPD, the RF channel ID, the BBP stream ID and the service ID are specified (procedure 19). Note that the association tag attribute is not disposed within the broadcastAppService element of the delivery-Method element of the USD, but may be disposed within the TPT.

Using the triplet, SCS Bootstrap information for acquiring the SCS of NRT service is acquired from the SCD saved in the NVRAM by the initial scanning processing, etc. So, the receiver connects to the SCS of the NRT service transmitted through the broadcasting wave to acquire the SCS according to the IP address, the port number and the TSI specified by the SCS Bootstrap information (procedures 20 and 21).

Since the files of the SCS are transmitted through the FLUTE session, by analyzing data stored in the LCT packet, the signaling information such as the USD, the MPD, the SDP, the FDD, or the like is acquired (procedure 22). Here, in the TPT of the main service, the URL (AppURL) showing the acquisition source of the TDO application corresponds to the URL of the basepattern element within the broadcastAppService element of the deliveryMethod element of the USD in the NRT service (procedure 23).

Also, as these URLs also correspond to the URL specified by the contentLocation attribute of the FDD of the NRT service, the URL (AppURL of TPT) specified by the basepattern element within the broadcastAppService element of the deliveryMethod element of the USD of the NRT service is matched with the URL specified by the contentLocation attribute of the FDD, thereby specifying the TSI and the TOI for acquiring the TDO application that is to be controlled by the TPT. In addition, by referring to the SDP, the IP address and the port number for acquiring the TDO application that is to be controlled by the TPT are specified (procedure 24).

The NRT related descriptors (NRT Service Descriptors) where information about the associated NRT is described are disposed in the SPD of the NRT service, the information described therein may be referred, as appropriate.

In this manner, the IP address, the port number, the TSI and the TOI for connecting to the stream of the associated NRT are acquired. The receiver connects to the stream of the associated NRT transmitted through the FLUTE session to acquire the LCT packet using the IP address, the port number, the TSI and the TOI of the associated NRT (procedures 25 and 26).

Then, the receiver extracts the data stored in the LCT packet (procedure 27), and accumulates the TDO application (NRT Content) of the associated NRT acquired thereby (procedure 28). In this manner, in the receiver, by rendering the TDO application accumulated, the TDO application is executed in conjunction with the broadcasting program, and a video image of the TDO application is displayed on and superimposed with the video image of the broadcasting program.

As described above, the operation example 2 of the associated NRT in FIG. 8, when the stream of the associated NRT is transmitted as the different stream from the audio and the video, using the SCS of the main service and the NRT service, the TDO application is acquired from the stream of the associated NRT, and is executed in conjunction with the broadcasting program. In this manner, in the digital broadcasting using the IP transmission method, the NRT service of the associated NRT can be provided.

(1-3) Operation Example 3 of Associated NRT

Figure 9:
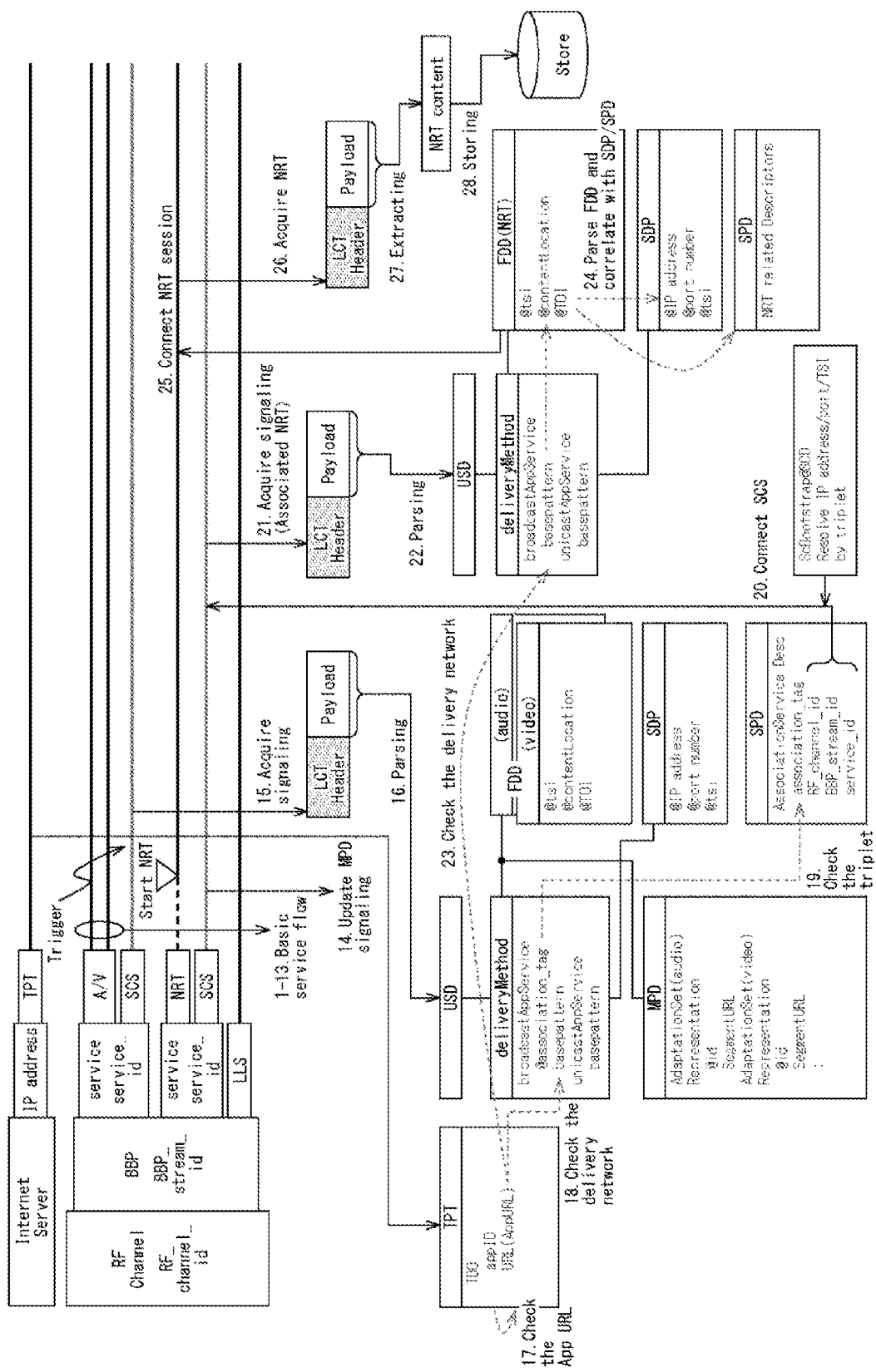
FIG. 9 is a diagram for explaining an operation example 3 of an associated NRT.

FIG. 9 is a diagram for explaining an operation example 3 of the associated NRT. In the operation example 3, the TPT is acquired through broadcasting, and the TDO application is acquired through broadcasting from the stream of the associated NRT transmitted as the different service from the main service.

In FIG. 9, the transmitter of the broadcasting station identified by the RF channel ID transmits the BBP stream (BBP Stream) identified by the BBP stream ID by the broadcasting wave (RF Channel) of digital broadcasting using the IP transmission method.

In the BBP stream, the audio or video stream ("A/V" in the figure) and the SCS are transmitted as the main service identified by the service ID together with the LLS. Also, as the NRT service, the stream of the associated NRT ("NRT" in the figure) and the SCS are transmitted. Into the audio or video stream, the trigger information is buried.

The stream of audio, video, and the associated NRT and the file of the signaling information (SCS) are transmitted through the FLUTE session. In the operation example 3 of the associated NRT, the TPT transmitted through communication from the internet server (TPT server) is acquired by the receiver.

In FIG. 9, the receiver installed in each home reproduces a video image and voice of a broadcasting program of the main service channel-selected by the user by executing procedure 1 to procedure 13 in the operation example (Basic Service flow) of the basic service in FIG. 6.

In the operation example 3 of the associated NRT in FIG. 9, the associated NRT is provided as compared with the operation example of the basic service in FIG. 6, at the time when provision of the associated NRT is started, description of the signaling information (SCS) corresponds to the associated NRT. The receiver always monitors updating of the MPD transmitted through the SCS, and reproduces the audio or video stream corresponding to the MPD (procedure 14).

The receiver always monitors the audio or video stream, accesses the TPT server via the internet according to the URL included in the trigger information when the trigger information included in the stream is extracted, and acquires the TPT. Also, the receiver connects to the SCS of the main service, and acquires the SCS (procedure 15). Note that as the files such as the USD are transmitted through the FLUTE session, the signaling information such as the USD is acquired by analyzing the data stored in the LCT packet (procedure 16).

In the TPT acquired from the TPT server, an ID (AppID) that identifies the TDO application and a URL (AppURL) that shows an acquisition source of the TDO application are described correspondingly. Here, as the AppURL of the TPT corresponds to the URL specified by the basepattern element within the broadcastAppService element of the deliveryMethod element of the USD, these URLs are matched, thereby specifying that the TDO application that is to be controlled by the TPT is transmitted through broadcasting (procedures 17 and 18).

In addition, in the broadcastAppService element, an association tag attribute is described in addition to the basepattern element. As the association tag attribute is associated with the association tag attribute of the Association Service Description described in the SPD, the RF channel ID, the BBP stream ID and the service ID are specified (procedure 19).

Using the triplet, the SCS Bootstrap information for acquiring the SCS of NRT service is acquired from the SCD saved in the NVRAM by the initial scanning processing, etc. So, the receiver connects to the SCS of the NRT service transmitted through the broadcasting wave to acquire the SCS according to the IP address, the port number and the TSI specified by the SCS Bootstrap information (procedures 20 and 21).

Since the files of the SCS are transmitted through the FLUTE session, by analyzing data stored in the LCT packet, the signaling information such as the USD, the MPD, the SDP, the FDD, or the like is acquired (procedure 22). Here, in the TPT acquired through broadcasting, the URL (AppURL) showing the acquisition source of the TDO application correspond to the URL of the basepattern element within the broadcastAppService element of the deliveryMethod element of the USD in the NRT service (procedure 23).

Also, as these URLs also correspond to the URL specified by the contentLocation attribute of the FDD of the NRT service, the URL (AppURL of TPT) specified by the basepattern element within the broadcastAppService element of the deliveryMethod element of the USD of the NRT service is matched with the URL specified by the contentLocation attribute of the FDD, thereby specifying the TSI and the TOI for acquiring the TDO application that is to be controlled by the TPT. In addition, by referring to the SDP, the IP address and the port number for acquiring the TDO application that is to be controlled by the TPT are specified (procedure 24).

The NRT related descriptors (NRT Service Descriptors) where information about the associated NRT is described are disposed in the SPD of the NRT service, the information described therein may be referred, as appropriate.

In this manner, the IP address, the port number, the TSI and the TOI for connecting to the stream of the associated NRT are acquired. The receiver connects to the stream of the associated NRT transmitted through the FLUTE session to acquire the LCT packet using the IP address, the port number, the TSI and the TOI for connecting to the stream of the associated NRT (procedures 25 and 26).

Then, the receiver extracts the data stored in the LCT packet (procedure 27), and accumulates the TDO application (NRT Content) of the associated NRT acquired thereby (procedure 28). In this manner, in the receiver, by rendering the TDO application accumulated, the TDO application is executed in conjunction with the broadcasting program, and a video image of the TDO application is displayed on and superimposed with the video image of the broadcasting program.

As described above, the operation example 3 of the associated NRT in FIG. 9, when the stream of the associated NRT is transmitted as the different stream from the audio and the video, using the TPT acquired through communication and the SCS of the main service and the NRT service, the TDO application is acquired from the stream of the associated NRT, and is executed in conjunction with the broadcasting program. In this manner, in the digital broadcasting using the IP transmission method, the NRT service of the associated NRT can be provided.

(1-4) Operation Example 4 of Associated NRT

Figure 10:
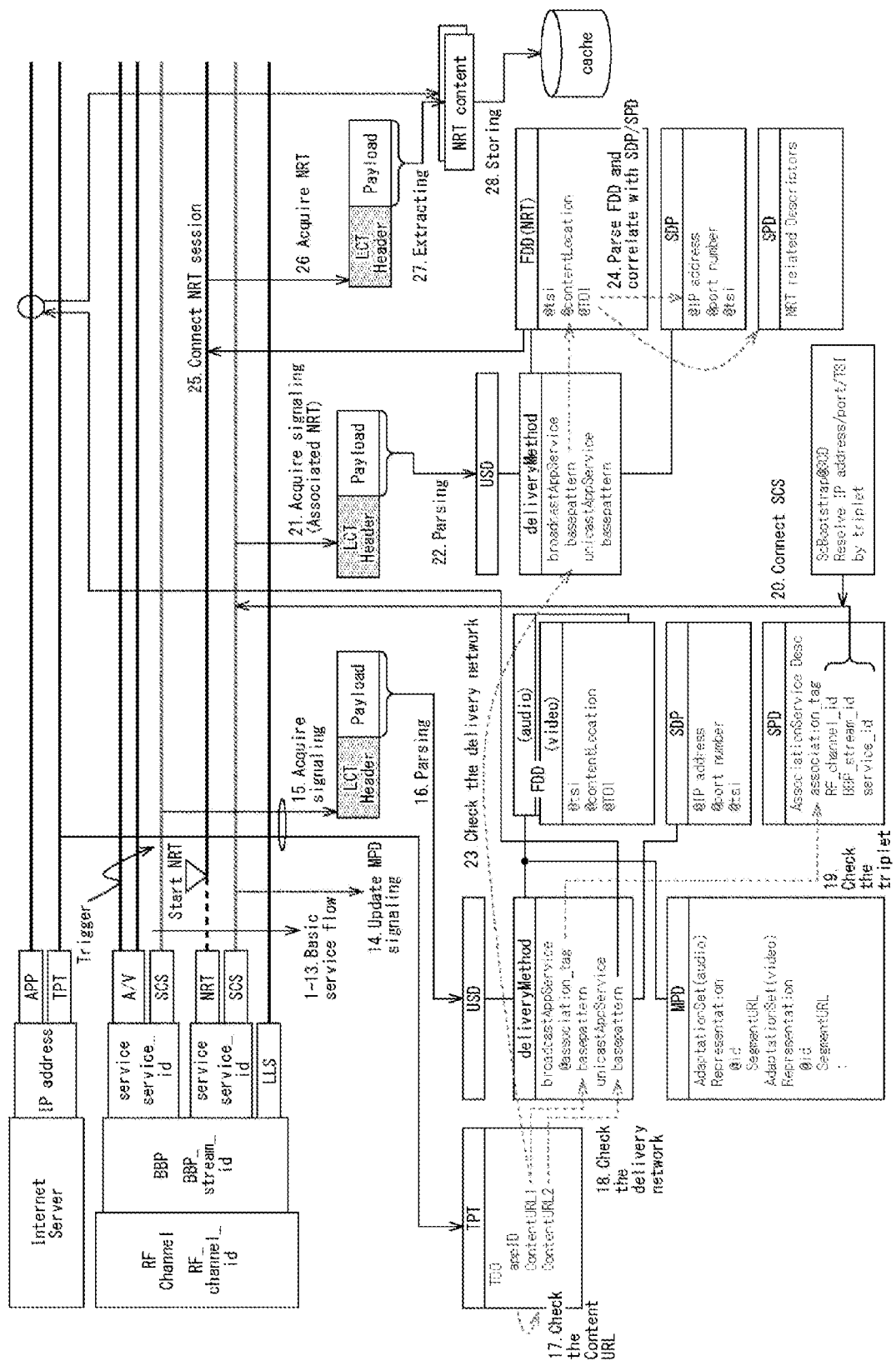
FIG. 10 is a diagram for explaining an operation example 4 of an associated NRT.

FIG. 10 is a diagram for explaining an operation example 4 of the associated NRT. In the operation example 4, the TPT is acquired through broadcasting, and a plurality of components configuring the TDO application are acquired through a plurality of delivery paths of broadcasting and communication.

In FIG. 10, the transmitter of the broadcasting station identified by the RF channel ID transmits the BBP stream (BBP Stream) identified by the BBP stream ID by the broadcasting wave (RF Channel) of digital broadcasting using the IP transmission method.

In the BBP stream, the audio or video stream ("A/V" in the figure) and the SCS are transmitted as the main service identified by the service ID together with the LLS. Also, as the NRT service, a stream of the associated NRT ("NRT" in the figure) is transmitted. Into the audio or video stream, the trigger information is buried.

The stream of audio, video, and the associated NRT and the file of the signaling information (SCS) are transmitted through the FLUTE session. In the operation example 4 of the associated NRT, the TPT transmitted through broadcasting from the TPT server and the TDO application transmitted through communication from the application server are acquired from the receiver.

In FIG. 10, the receiver installed in each home reproduces a video image and voice of a broadcasting program of the main service channel-selected by the user by executing procedure 1 to procedure 13 in the operation example (Basic Service flow) of the basic service in FIG. 6.

In the operation example 4 of the associated NRT in FIG. 10, the associated NRT is provided as compared with the operation example of the basic service in FIG. 6, at the time when provision of the associated NRT is started, description of the signaling information (SCS) corresponds to the associated NRT. The receiver always monitors updating of the MPD transmitted through the SCS, and reproduces the audio or video stream corresponding to the MPD (procedure 14).

The receiver always monitors the audio or video stream, accesses the TPT server via the internet according to the URL included in the trigger information when the trigger information included in the stream is extracted, and acquires the TPT. Also, the receiver connects to the SCS of the main service, and acquires the SCS (procedure 15). Note that as the files such as the USD are transmitted through the FLUTE session, the signaling information such as the USD is acquired by analyzing the data stored in the LCT packet (procedure 16).

In the TPT acquired from the TPT server, an ID (AppID) that identifies the TDO application and a URL (ContentURL) that shows an acquisition source of the TDO application are described correspondingly. Here, as the TDO application is configured of a plurality of components and acquisition sources of the respective components are different, ContentURL1 and ContentURL2 are described as the URL of the acquisition sources of the respective components.

As the ContentURL of the TPT corresponds to the broadcastAppService element of the deliveryMethod element of the URL specified by the basepattern element in the unicastAppService element, these URLs are matched. As the result of the matching, the ContentURL1 of the TPT corresponds to the URL of the basepattern element in the broadcastAppService element, thereby specifying that the components configuring the TDO application corresponding to the ContentURL1 are transmitted through broadcasting (procedures 17 and 18).

Also, the ContentURL2 of the TPT corresponds to the URL specified by the basepattern element within the unicastAppService element, thereby specifying that the components configuring the TDO application corresponding to the ContentURL2 are transmitted through broadcasting (procedures 17 and 18).

In addition, within the broadcastAppService element, an association tag attribute is described in addition to the basepattern element. As the association tag attribute is associated with the association tag attribute of the Association Service Description described in the SPD, the RF channel ID, the BBP stream ID and the service ID are specified (procedure 19).

Using the triplet, the SCS Bootstrap information for acquiring the SCS of NRT service is acquired from the SCD saved in the NVRAM by the initial scanning processing, etc. So, the receiver connects to the SCS of the NRT service transmitted through the broadcasting wave to acquire the SCS according to the IP address, the port number and the TSI specified by the SCS Bootstrap information (procedures 20 and 21).

Since the files of the SCS are transmitted through the FLUTE session, by analyzing data stored in the LCT packet, the signaling information such as the USD, the MPD, the SDP, the FDD, or the like is acquired (procedure 22). Here, in the TPT acquired through broadcasting, the URL (ContentURL1) showing the acquisition source of the components configuring the TDO application correspond to the URL of the basepattern element within the broadcastAppService element of the deliveryMethod element of the USD in the NRT service (procedure 23).

Also, as these URLs also correspond to the URL specified by the contentLocation attribute of the FDD of the NRT service, the URL (ContentURL1 of TPT) specified by the basepattern element within the broadcastAppService element of the deliveryMethod element of the USD of the NRT service is matched with the URL specified by the contentLocation attribute of the FDD, thereby specifying the TSI and the TOI for acquiring the components configuring the TDO application that is to be controlled by the TPT. In addition, by referring to the SDP, the IP address and the port number for acquiring the components configuring the TDO application that is to be controlled by the TPT are specified (procedure 24).

The NRT related descriptors (NRT Service Descriptors) where information about the associated NRT is described are disposed in the SPD of the NRT service, the information described therein may be referred, as appropriate.

In this manner, the IP address, the port number, the TSI and the TOI for connecting to the stream of the associated NRT are acquired. The receiver connects to the stream of the associated NRT transmitted through the FLUTE session to acquire the LCT packet using the IP address, the port number, the TSI and the TOI of the stream of the associated NRT (procedures 25 and 26).

Then, the receiver extracts the data stored in the LCT packet (procedure 27), thereby acquiring the components (NRT Content) configuring the TDP application.

As a part of the components configuring the TDO application is also transmitted through communication (the above-described procedures 17 and 18), the receiver accesses the application server via the internet, and acquires the components configuring the TDO application. In this manner, the components configuring the TDO application are acquired through broadcasting and communication, thereby providing all components.

The receiver accumulates the components (NRT Content) configuring the TDO application of the associated NRT acquired through broadcasting and communication (procedure 28). In this manner, the receiver performs rendering of the TDO application accumulated, the TDO application is executed in conjunction with the broadcasting program, and a video image of the TDO application is displayed on and superimposed with the video image of the broadcasting program.

As above, in the operation example 4 of the associated NRT in FIG. 10, when the stream of the associated NRT is transmitted as the different stream from the audio and the video, using the TPT acquired through communication and the SCS of the main service and the NRT service, the TDO application restored from the components transmitted through the stream of the associated NRT or the application server is acquired, and is executed in conjunction with the broadcasting program. In this manner, in the digital broadcasting using the IP transmission method, the NRT service of the associated NRT can be provided.

(2-1) Operation Example 1 of Stand-Alone NRT

Figure 11:
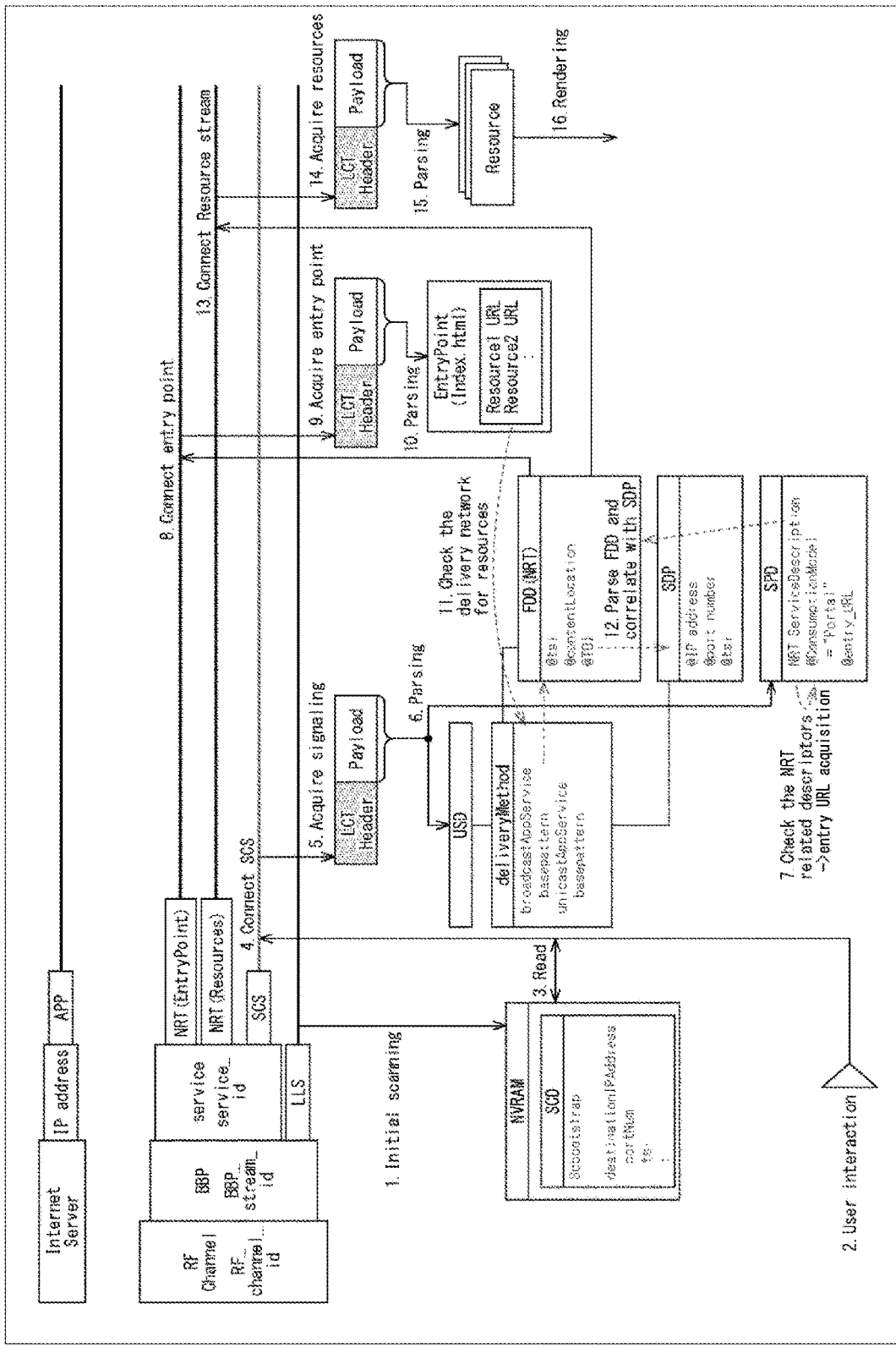
FIG. 11 is a diagram for explaining an operation example 1 of a stand-alone NRT.

FIG. 11 is a diagram for explaining an operation example 1 of a stand-alone NRT. In the operation example 1, an NRT entry point and an NRT resource configuring an NDO application are acquired through broadcasting from a stream of the stand-alone NRT.

In FIG. 11, the transmitter of the broadcasting station (broadcasting carrier) identified by the RF channel ID transmits the BBP stream (BBP Stream) identified by the BBP stream ID by the broadcasting wave (RF Channel) of the digital broadcasting using the IP transmission method. In the BBP stream, a stream of the stand-alone NRT and the SCS are transmitted as the service identified by the service ID together with the LLS.

The files of the stream and the signaling information (SCS) of the stand-alone NRT are transmitted through the FLUTE session. Note that in the stream of the stand-alone NRT, an NRT entry point (Entry Point) and an NRT resource (Resources) are transmitted through a different FLUTE session. In the operation example 1 of the stand-alone NRT in FIG. 11, as only the stream transmitted through broadcasting is acquired, no stream transmitted through communication via the internet server (Internet Server) is acquired.

In FIG. 11, at the receiver installed in each home receiver, by the initial scanning processing, the SCD transmitted through LLS is acquired, and is saved in the NVRAM (procedure 1). The SCD includes SCS Bootstrap information to which the IP address, the port number and the TSI acquiring the SCS are described. Here, when the user selects portal service (channel selection) (procedure 2), the receiver reads the SCD from the NVRAM (procedure 3), according to the SCS Bootstrap information, connects to the SCS transmitted through the broadcasting wave to acquire the SCS (procedures 4 and 5).

Since the files of the SCS are transmitted through the FLUTE session, by analyzing data stored in the LCT packet, the signaling information such as the USD, the MPD, the SDP, the FDD, or the like is acquired (procedure 6). Also, the reference information is described in the USD. Using the reference information, the SDP, the FDD and the SDP are acquired. As the signaling information is entirely included in the SCS, they can be acquired at once.

To an NRT related descriptor (NRT Service Description) of the SPD, a ConsumptionModel attribute and an entryURL attribute are described, the URL (Entry URL) at the NRT entry point of the portal service selected is specified, and the URL (Entry URL) at the NRT entry point is thus acquired (procedure 7).

The URL (Entry URL) at the NRT entry point of the NRT related descriptor (NRT Service Description) of the SPD corresponds to the URL specified by the contentLocation attribute of the FDD. By matching the URL of the NRT entry point (Entry URL) with the URL specified by the contentLocation attribute of the FDD, the TSI and the TOI for acquiring the NRT entry point are specified. By referring to the SDP, the IP address and the port number for acquiring the NRT entry point are specified.

In this manner, the IP address, the port number, the TSI and the TOI for connecting to the stream at the NRT entry point are acquired, respectively. The receiver is connected to the stream at the NRT entry point transmitted through the FLUTE session using the IP address, the port number, and the TSI and the TOI of the stream at the NRT entry point, and acquires the LCT packet (procedures 8 and 9). Then, the receiver analyzes the data stored in the LCT packet (procedure 10) to acquire the file at the NRT entry point (for example, Index.html).

At the NRT entry point, the URL (ResourceURL) showing the acquisition source of the NRT resource is described. Here, the plurality of NRT resources are listed, as the URL of the acquisition source per NRT resource, the URL of the NRT resource 1 (Resource1) and the URL of the NRT resource 2 (Resource2) are described.

Here, as the URL (ResourceURL) of the acquisition source of the NRT resource at NRT entry point corresponds to the URLs the basepattern element within the broadcastAppService element or the unicastAppService element of the deliveryMethod element of the USD, these URLs are matched, thereby specifying that the NRT resource is transmitted through broadcasting or communication (procedure 11). For example, as the URL of the NRT resource 1 at the NRT entry point corresponds to the URL specified by the basepattern element within the broadcastAppService element of the deliveryMethod element of the USD, it is specified that the stream of the NRT resource 1 is transmitted through broadcasting.

As these URLs also correspond to the URL specified by the contentLocation attribute of the FDD, the URL (URL of the NRT resource 1 at the NRT entry point) specified by the basepattern element within the broadcastAppService element of the deliveryMethod element of the USD is matched with the URL specified by the contentLocation attribute of the FDD, thereby specifying the TSI and the TOI for acquiring the NRT resource 1. In addition, by referring to the SDP, the IP address and the port number for acquiring the NRT resource 1 are specified (procedure 12).

In this manner, the IP address, the port number, the TSI and the TOI for connecting to the stream of the NRT resource 1 are acquired. The receiver connects to the stream of the NRT resource 1 transmitted through the FLUTE session using the IP address, the port number, the TSI and the TOI of the NRT resource 1 to acquire the LCT packet (procedures 13 and 14).

Then, by extracting and analyzing the data stored in the LCT packet by the receiver, the data of the NRT resource 1 is acquired (procedure 15). Also, as to the NRT resource 2, similar to the NRT resource 1, by connecting to the stream of the NRT resource 2 transmitted through the FLUTE session, the data of the NRT resource 2 is acquired.

When the NRT resource 2 is transmitted through communication, the receiver accesses the application server via the internet according to the URL (ResourceURL) of the NRT entry point, thereby acquiring the data of the NRT resource 2. In this manner, the receiver acquires the data of each NRT resource listed in the NRT entry point through broadcasting or communication, by performing rendering (procedure 16), a video image of the NDO application corresponding to the portal service selected by the user is displayed.

As above, in the operation example 1 of the stand-alone NRT in FIG. 11, when the streams of the NRT entry point and the NRT resource are transmitted as the stream of the stand-alone NRT, the SCS in the service same as that of these streams is used, thereby acquiring and displaying the NDO application restored from the NRT entry point and the NRT resource. In this manner, in the digital broadcasting using the IP transmission method, the NRT service of the associated NRT can be provided.

Although the operation example 1 of the stand-alone NRT in FIG. 11 illustrates that the NRT entry point and the NRT resource are transmitted through different FLUTE sessions, and the FLUTE sessions are identified by the TSI, it is not limited thereto. For example, when a code point of the LCT header is used and "0" is specified as the value of the code point, it is the LCT packet of the NRT entry point. When other than "0" is specified, it is the LCT packet of the NRT resource. Thus, the NRT entry point may be distinguished from the NRT resource.

<3. Syntax>
(SPD Syntax)

FIG. 12 is a diagram showing an example of SPD syntax. The SPD is described, for example, by the markup language such as XML. In FIG. 12, the attribute is distinguished from the element by attaching "@". In addition, the elements and the attributes are indented against the upper elements.

As shown in FIG. 12, an Spd element is an upper element of a serviceId attribute, a spIndicator attribute, a Protocol VersionDescription element, an NRTServiceDescription element, a CapabilityDescription element, an IconDescription element, an ISO639LanguageDescription element, a ReceiverTargetingDescription element, an AssociatedServiceDescription element, a ContentAdvisoryDescription element and a Component element.

In the serviceId attribute, the service ID is specified. In the spIndicator attribute, it is specified whether or not the service is encrypted per service identified by the service ID.

In the Protocol VersionDescription element, information showing the service of the data is specified. In the NRTServiceDescription element, information relating to the NRT service in specified. Note that the NRTServiceDescription element corresponds to the NRT related descriptor (NRT Service Description) in FIG. 11, and a detailed structure thereof will be described below referring to syntax in FIG. 13.

In the CapabilityDescription element, information about a function (capability) that is necessary for the receiver with which the NRT service is provided is specified. In the IconDescription element, information showing an acquisition source of an icon used in the NRT service is specified. In the ISO639LanguageDescription element, a language code of the NRT service is specified.

In the ReceiverTargetingDescription element, target information of the NRT service is specified. In the AssociatedServiceDescription element, information about related dependent service is specified. The AssociatedServiceDescription element corresponds to the "Association Service Description" described in FIG. 8 to FIG. 10. In the ContentAdvisoryDescription element, information about rating region is specified.

In the SPD, by the above-described Description elements, a variety of parameters are designated in a service level. In addition, by Component elements below, a variety of parameters are designated in a component level.

The Component element is an upper element of a componentId attribute, a representationId attribute, a subRepresentationLevel attribute, a componentCategory attribute, a locationType attribute, a componentEncription attribute, a TargetedDevice element, a ContentAdvisoryDescription element, an AVCVideoDescription element, an HEVCVideoDescription element, a MPEG4AACAudioDescription element, an AC3AudioDescription element and a CaptionDescription element.

In the componentId attribute, a component ID is specified.

In the representationId attribute, the representation ID is specified. By the representation ID, the components may be corresponded among the signaling information (such as the MPD, the SDP and the USD) of the SCS.

In the subRepresentationLevel attribute, a subrepresentation level is specified. For example, the subrepresentation level becomes information to identify the components when the components are stored to a plurality of categories (for example, video and audio) in each segment upon the FLUTE session.

In the componentCategory attribute, category information of the component is specified. As the category information, for example, "video", "audio", "caption" and "nrt" are specified.

In the locationType attribute, type information of a location of the component is specified. As the type information, for example, "bb (Broadband)", "bca (Broadcast actual)" and "bco (Broadcast other)" are specified.

In the componentEncription attribute, whether or not the component is encrypted per component identified by the component. In the TargetedDevice element, information about a target apparatus is specified. In the ContentAdvisoryDescription element, the rating information is specified in a component unit.

In the AVCVideoDescription element, when AVC (Advanced Video Coding) is used as a coding method of video data, a video parameter is specified. In the HEVCVideoDescription element, when HEVC (High Efficiency Video Coding) is used as a coding method of video data, a video parameter is specified.

Note that the AVC and the HEVC are examples of the video data coding method. When other coding method is used, the VideoDescription element corresponding thereto is specified.

In the MPEG4AACAudioDescription element, when MPEG4AAC (Advanced Audio Coding) is used as a coding method of audio data, an audio parameter is specified.

In the AC3AudioDescription element, when MPEG4AAC AC3 (Audio Code number 3) is used as a coding method of audio data, an audio parameter is specified audio.

Note that the MPEG4AAC and the AC3 are examples of the audio data coding method. When other coding method is used, the AudioDescription element corresponding thereto is specified.

In the CaptionDescription element, a caption parameter is specified.

In FIG. 12, the Protocol VersionDescription element, the NRTServiceDescription element, the CapabilityDescription element, the IconDescription element, the ISO639- LanguageDescription element and the ReceiverTargetingDescription element are designated for the NRT service.

In the number of occurrences (Cardinality) in FIG. 12, when "1" is specified, only one element or attribute is surely specified. When "0 . . . 1" is specified, it is voluntary whether or not the element or the attribute is specified. When "1 . . . n" is specified, one or more elements or attributes are specified. When "0 . . . n" is specified, it is voluntary whether or not one or more elements or attributes are specified. The meanings of the number of occurrences are similar in syntax in FIG. 13 later.

(NRTServiceDescription Element)

FIG. 13 is a diagram showing an example of syntax of the NRT Service Description element in FIG. 12. The NRTServiceDescription element is described by, for example, the markup language such as XML.

In FIG. 13, the attribute is distinguished from the element by attaching "A". In addition, the elements and the attributes are indented against the upper elements.

In FIG. 13, the NRTServiceDescription element is an upper element of the ConsumptionModel attribute, the autoUpdate attribute, the storageReservarion attribute, the defaultContentSize attribute and the entryURL attribute.

In the ConsumptionModel attribute, an NRT consumption model is specified. As the NRT consumption model, for example, "B&D", "push", "portal", "triggered" and "scripted" are specified. In the autoUpdate attribute, it is specified whether or not the NRT service is automatically updated.

In the storageReservarion attribute, a storage size necessary for the NRT service is specified. In the defaultContentSize attribute, sizes of default NRT contents are specified.

In the entryURL attribute, the URL (Entry URL) at the NRT entry point in the stand-alone NRT is specified.

<4. System Configuration>

(Configuration of Broadcasting Communication System)

Figure 14:
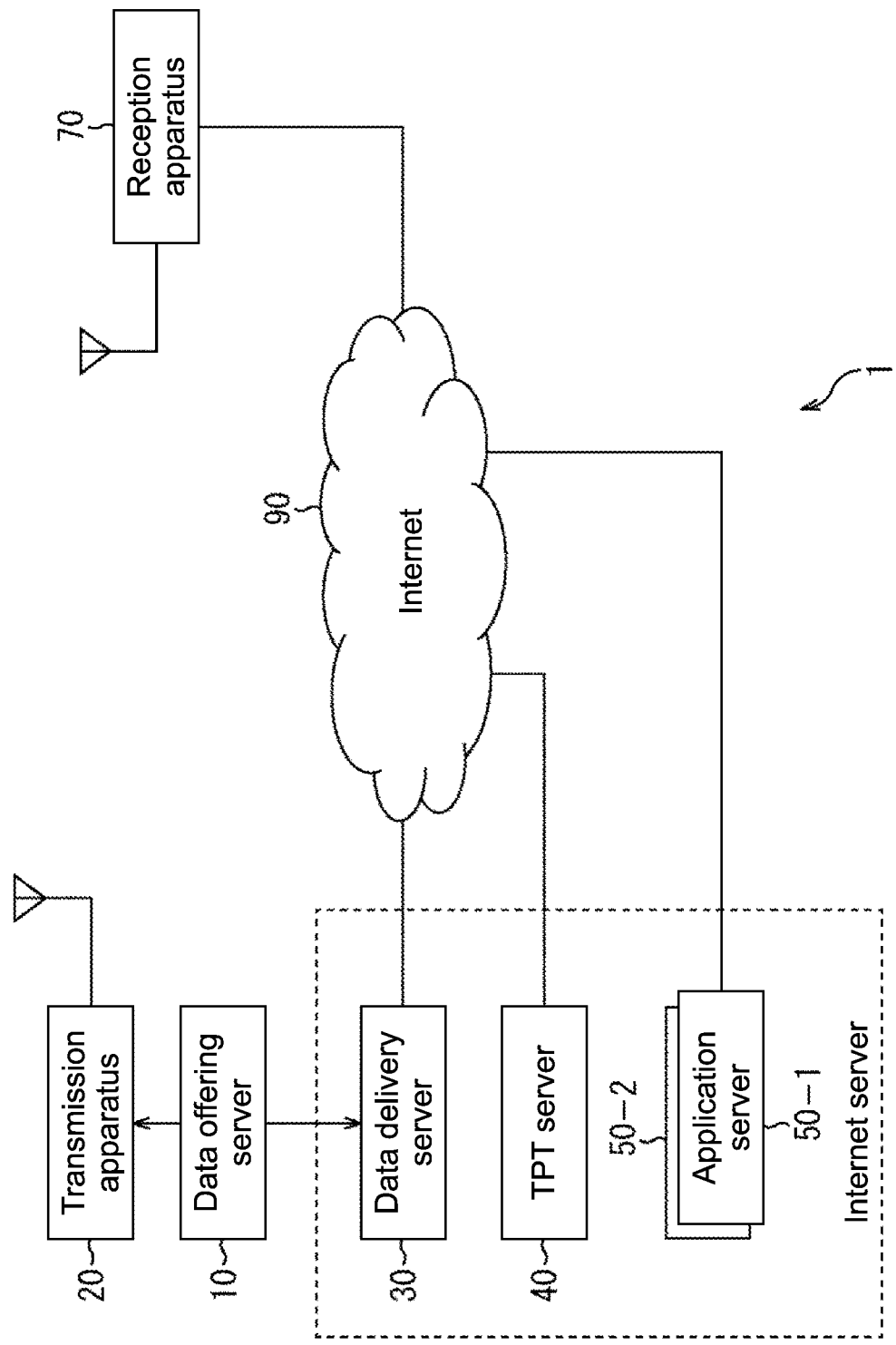
FIG. 14 is a diagram showing a configuration example of a broadcasting communication system.

FIG. 14 is a diagram showing a configuration example of a broadcasting communication system to which the present technology is applied. The system means an assemble of a plurality of configuration elements (such as apparatuses).

A broadcasting communication system 1 in FIG. 14 is a system that can provide the above-described NRT service. In FIG. 14, the broadcasting communication system 1 is configured of a data offering server 10, a transmission apparatus 20, a data delivery server 30, a TPT server 40, an application server 50-1, an application server 50-2 and a reception apparatus 70. The reception apparatus 70 communicates with internet servers such as the data delivery server 30, the TPT server 40, the application server 50-1 and the application server 50-2 via an internet 90.

The data offering server 10 accumulates stream data of AV contents including a variety of components such as audio, video and captions, and original data for generating the signaling information. The data offering server 10 generates segment data based on the stream data of the AV contents, and provides the transmission apparatus 20 or the data delivery server 30 with the segment data. Also, the data offering server 10 provides the transmission apparatus 20 of the data delivery server 30 with the original data of the signaling information.

The transmission apparatus 20 acquires the segment data provided from the data offering server 10, and the original data of the signaling information. The transmission apparatus 20 generates the signaling information based on the original data of the signaling information from the data offering server 10. The transmission apparatus 20 transmits the signaling information in a digital broadcasting signal together with the segment data. Also, the transmission apparatus 20 can transmits the TDO application or the NDO application by the digital broadcasting signal.

The transmission apparatus 20 corresponds to the above-described transmitter (FIG. 6 to FIG. 11), and is provided by the broadcasting carrier, for example. The files of the segment data of the audio and the video and the SCS (Service Channel Signaling) are transmitted through the FLUTE (File Delivery over Unidirectional Transport) session.

The data delivery server 30 acquires the segment data provided from the data offering server 10 and the original data of the signaling information. The data delivery server 30 generates the signaling information based on the original data of the signaling information from the data offering server 10. The data delivery server 30 delivers the segment data or the signaling information to the reception apparatus 70 via the internet 90 by request from the reception apparatus 70.

The data delivery server 30 corresponds to the above-described internet server (FIG. 6), and is provided by the broadcasting carrier, for example.

A TPT server 40 administers the TPT (TDO Parameter Table). The TPT server 40 delivers the TPT to the reception apparatus 70 via the internet 90 by request from the reception apparatus 70. The TPT server 40 corresponds to the above-described TPT server (FIG. 7 to FIG. 10).

The application server 50-1 administers the TDO application provided by the associated NRT. The application server 50-1 delivers the TDO application to the reception apparatus 70 via the internet 90 by request from the reception apparatus 70. The application server 50-1 corresponds to the above-described application server (FIG. 10).

The application server 50-2 administers the NDO application (NRT resource) provided from the stand-alone NRT. The application server 50-2 delivers the NDO application (NRT resource) to the reception apparatus 70 via the internet 90 by request from the reception apparatus 70. The application server 50-2 corresponds to the above-described application server (FIG. 11).

In the following description, if there is no need to distinguish the application server 50-1 from the application server 50-2, it refers to an application server 50.

The reception apparatus 70 receives the segment data and the signaling information transmitted by the digital broadcasting signal from the transmission apparatus 20. Also, the reception apparatus 70 receives the segment data and the signaling information transmitted from the data delivery server 30 via the internet 90 by request to the data delivery server 30. The reception apparatus 70 acquires the segment data transmitted through broadcasting or communication based on the signaling information transmitted through broadcasting or communication to reproduce a video image and voice of the AV contents.

The reception apparatus 70 receives the TPT from the TPT server 40 via the internet 90 by request to the TPT server 40. The reception apparatus 70 receives the TDO application from the application server 50-1 via the internet 90 by request to the application server 50-1. Furthermore, the reception apparatus 70 receives the NDO application (NRT resource) from the application server 50-2 via the internet 90 by request to the application server 50-2.

The reception apparatus 70 receives and executes the TDO application transmitted through broadcasting or communication based on the TPT included in the signaling information from the transmission apparatus 20 or the TPT from the TPT server 40. In addition, the reception apparatus 70 receives the NRT resource transmitted through broadcasting or communication and executes the NDO application based on the NRT entry point of the stand-alone NRT transmitted through broadcasting.

The reception apparatus 70 corresponds to the above-described receiver (FIG. 6 to FIG. 11, etc.), and is installed in each user's home, etc. For example, the reception apparatus 70 is configured as the television receiver.

The broadcasting communication system 1 is configured as described above. Next, a detailed configuration of each apparatus of the broadcasting communication system 1 in FIG. 14 will be described.

Configuration Example of Transmission Apparatus

Figure 15:
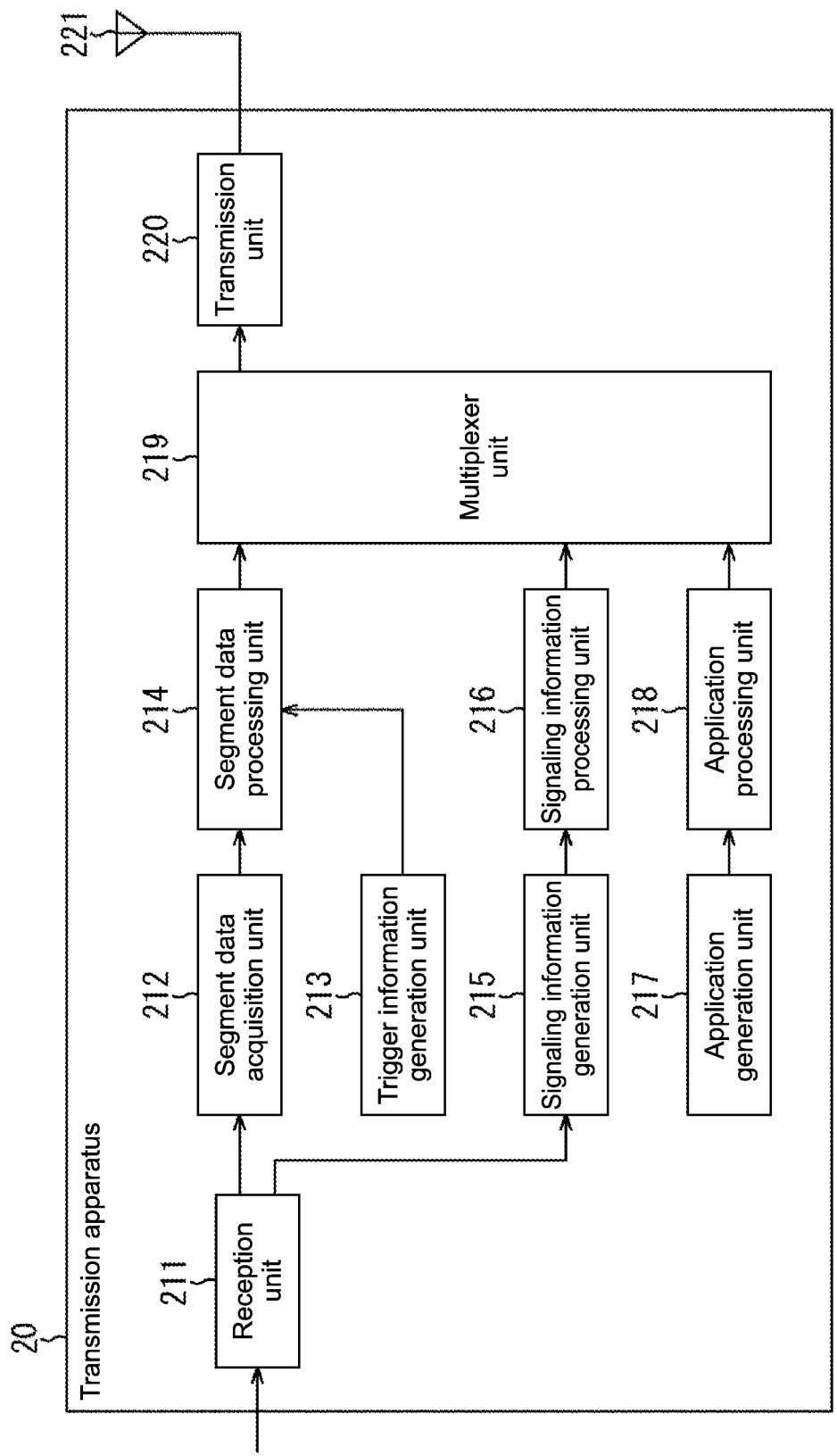
FIG. 15 is a diagram showing a configuration example of a transmission apparatus.

FIG. 15 is a diagram showing a configuration example of a transmission apparatus 20.

In FIG. 15, the transmission apparatus 20 is configured of a reception unit 211, a segment data acquisition unit 212, a trigger information generation unit 213, a segment data processing unit 214, a signaling information generation unit 215, a signaling information processing unit 216, an application generation unit 217, an application processing unit 218, a multiplexer unit 219 and a transmission unit 220.

The reception unit 211 receives the segment data transmitted from the data offering server 10 and the original data of the signaling information, and supplies the segment data acquisition unit 212 with the segment data and the signaling information generation unit 215 with the original data of the signaling information.

The segment data acquisition unit 212 acquires the segment data supplied from the reception unit 211, and supplies the segment data processing unit 214 with the segment data. The trigger information generation unit 213 generates the trigger information, and supplies the segment data processing unit 214 with the trigger information.

The segment data processing unit 214 processes the segment data supplied from the segment data acquisition unit 212, and supplies a multiplexer unit 219 with the stream thus provided. In addition, the segment data processing unit 214 buries the trigger information supplied from the trigger information generation unit 213 into the stream such as audio, video and captions.

The signaling information generation unit 215 generates the signaling information based on the original data of the signaling information supplied from the reception unit 211, and supplies the signaling information processing unit 216 with the signaling information. The signaling information processing unit 216 processes the signaling information supplied from the signaling information generation unit 215, and supplies the multiplexer unit 219 with the signaling information.

The application generation unit 217 generates the TDO application (or components thereof) when the TDO application provided by the associated NRT is transmitted through broadcasting, and supplies the application processing unit 218 with the TDO application. In addition, the application generation unit 217 generates the NDO application (NRT entry point, NRT resource) when the NDO application provided by the stand-alone NRT is transmitted through broadcasting, and supplies the application processing unit 218 with the NDO application.

The application processing unit 218 processes the TDO application or the NDO application supplied from the application generation unit 217, and supplies the multiplexer unit 219 with the TDO application or the NDO application.

The multiplexer unit 219 multiplexes the streams such as audio, video and captions from the segment data processing unit 214 and the signaling information from the signaling information processing unit 216, generates the BBP stream, and supplies the transmission unit 220 with the BBP stream. In addition, the multiplexer unit 219 further multiplexes the TDO application or the NDO application supplied from the application processing unit 218, when the TDO application or the NDO application is transmitted through broadcasting.

The transmission unit 220 modulates the BBP stream supplied from the multiplexer unit 219, and transmits the BBP stream by the digital broadcasting signal via an antenna 221. At this time, the segment data such as audio or video and the file of the SCS are transmitted through the FLUTE session by the broadcasting wave of the digital broadcasting using the IP transmission method.

Configuration Example of Each Server

Figure 16:
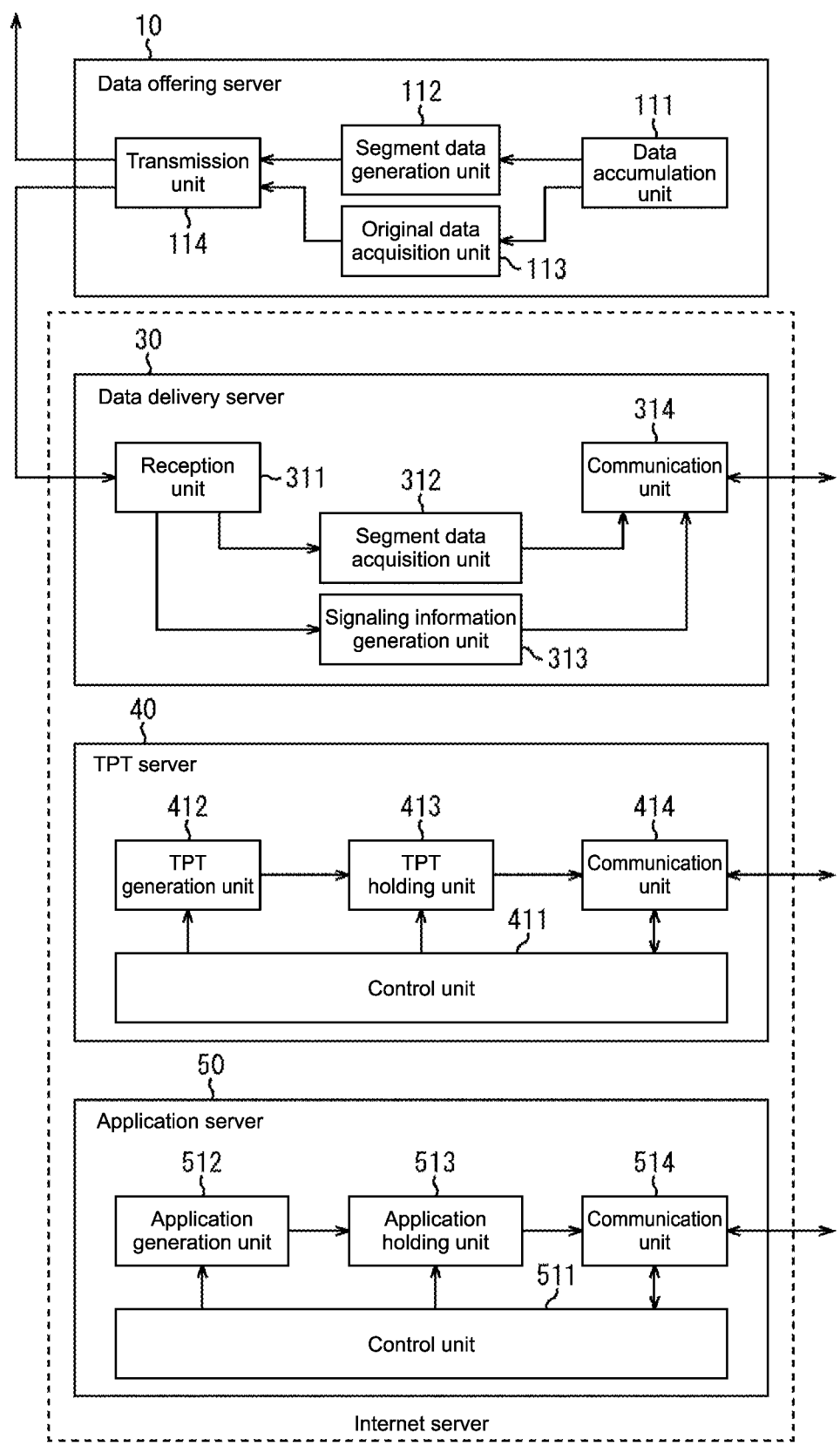
FIG. 16 is a diagram showing a configuration example of each server.

FIG. 16 is a diagram showing a configuration example of each server in FIG. 14. The internet server including the data delivery server 30, the TPT server 40 and the application server 50 corresponds to the above-described internet server (FIG. 6 to FIG. 11).

In FIG. 16, the data offering server 10 is configured of a data accumulation unit 111, the segment data generation unit 112, the original data acquisition unit 113 and the transmission unit 114.

The data accumulation unit 111 accumulates the stream data of the AV contents including a variety of streams such as audio, video and captions, and the original data of the signaling information.

The segment data generation unit 112 acquires the stream data of the AV contents such as audio or video accumulated on the data accumulation unit 111. The segment data generation unit 112 generates the segment data based on the stream, and supplies the transmission unit 114 with the segment data. The original data acquisition unit 113 acquires the original data accumulated on the data accumulation unit 111, and supplies the transmission unit 114 with the original data.

The transmission unit 114 is supplied with the segment data from the segment data generation unit 112 and the original data of the signaling information from the original data acquisition unit 113. The transmission unit 114 transmits the segment data and the original data of the signaling information to the transmission apparatus 20 or the data delivery server 30.

The data offering server 10 is configured as described above.

In FIG. 16, the data delivery server 30 is configured of the reception unit 311, the segment data acquisition unit 312, the signaling information generation unit 313 and the communication unit 314.

The reception unit 311 receives the segment data transmitted from the data offering server 10 and the original data of the signaling information, and supplies the segment data acquisition unit 312 with the segment data, and the signaling information generation unit 313 with the original data of the signaling information.

The segment data acquisition unit 312 acquires and processes the segment data supplied from the reception unit 311, and supplies the communication unit 314 with the segment data. The signaling information generation unit 313 generates the signaling information based on the original data of the signaling information supplied from the reception unit 311, and supplies the communication unit 314 with the signaling information.

To the communication unit 314, the segment data from the segment data acquisition unit 312 and the signaling information from the signaling information generation unit 313 are supplied. The communication unit 314 transmits the segment data or the signaling information to the reception apparatus 70 via the internet 90 by request from the segment data or the signaling information from the reception apparatus 70.

The data delivery server 30 is configured as described above.

In FIG. 16, the TPT server 40 is configured of a control unit 411, a TPT generation unit 412, a TPT holding unit 413 and a communication unit 414.

The control unit 411 controls the action of each unit of the TPT server 40. The TPT generation unit 412 generates the TPT according to the control by the control unit 411, which is held by the TPT holding unit 413. The communication unit 414 acquires the TPT held in the TPT holding unit 413 by request from the reception apparatus 70 according to the control by the control unit 411, and transmits the TPT to the reception apparatus 70 via the internet 90.

The TPT server 40 is configured as described above.

In FIG. 16, the application server 50 is configured of a control unit 511, an application generation unit 512, an application holding unit 513 and a communication unit 514.

The control unit 511 controls the action of each unit of the TPT server 50. The application generation unit 512 generates the application according to the control by the control unit 511, which is held by the application holding unit 513. The communication unit 514 acquires the application held in the application holding unit 513 by request from the reception apparatus 70 according to the control by the control unit 511, and transmits the application to the reception apparatus 70 via the internet 90.

When the application server 50 in FIG. 16 is the application server 50-1, the application holding unit 513 holds the TDO application generated by the application generation unit 512. When the application server 50 in FIG. 16 is the application server 50-2, the application holding unit 513 holds the NDO application generated by the application generation unit 512.

The application server 50 is configured as described above.

In FIG. 14 and FIG. 16, as a matter of explanation convenience, the data offering server 10, the data delivery server 30, the TPT server 40 and the application server 50 at a transmission side are explained as separate apparatuses. The apparatuses at the transmission side may have a functional configuration shown in FIG. 16, and the data offering server 10, the data delivery server 30, the TPT server 40 and the application server 50 may be considered as one apparatus, for example. In this case, for example, overlapped functions in the control unit and the communication unit may be combined into one.

Also, for example, the function to provide the segment data and the function to provide the signaling information in the data delivery server 30 may be separated such that the segment data and the signaling information may be provided from different servers. In addition, instead of the data offering server 10, the segment data may be generated in the transmission apparatus 20 or the data delivery server 30.

(Configuration Example of Reception Apparatus)

Figure 17:
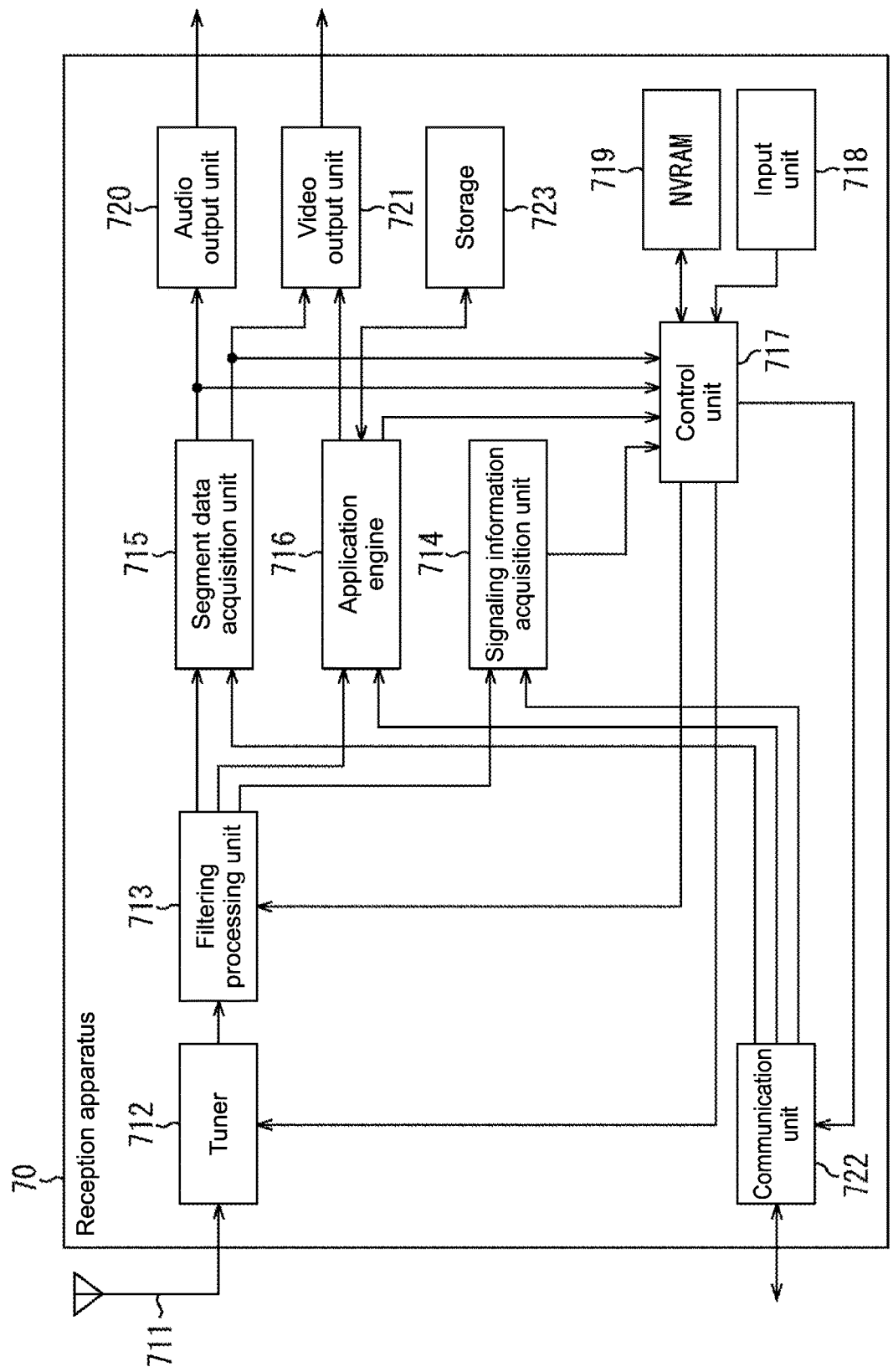
FIG. 17 is a diagram showing a configuration example of a reception apparatus.

FIG. 17 is a diagram showing a configuration example of a reception apparatus 70 in FIG. 14.

In FIG. 17, the reception apparatus 70 is configured of a tuner 712, a filtering processing unit 713, a signaling information acquisition unit 714, a segment data acquisition unit 715, an application engine 716, a control unit 717, an input unit 718, an NVRAM 719, an audio output unit 720, a video output unit 721, a communication unit 722 and a storage 723.

The tuner 712 extracts and decodes a digital broadcasting signal of specific service of which channel is selected according to the control by the control unit 717 from the broadcasting wave of the digital broadcasting using the IP transmission method received via an antenna 711, and supplies the filtering processing unit 713 with the resultant BBP stream.

The filtering processing unit 713 performs filtering processing using the IP address, the port number, the TSI, the TOI and the like to the packet transmitted by the BBP stream supplied from the tuner 712 according to the control by the control unit 717. The signaling information such as the LLS and the SCS extracted by the filtering processing are supplied to the signaling information acquisition unit 714, and the segment data is supplied to the segment data acquisition unit 715. The applications such as the TDO application and the NDO application are supplied to the application engine 716.

The signaling information acquisition unit 714 acquires and processes the signaling information acquired as a result of the filtering processing by the filtering processing unit 713 or the signaling information supplied from the communication unit 722 to supply the control unit 717 with the signaling information. When the SCS acquired as the signaling information is transmitted through the FLUTE session, the file such as the USD and the MPD is acquired by analyzing the data stored in the LCT packet.

The control unit 717 controls the action of each unit of the reception apparatus 70 based on an operation signal from the input unit 718. When the LLS is supplied from the signaling information acquisition unit 714 as the signaling information upon the initial scanning processing, the control unit 717 saves the SCD as channel selection information in the NVRAM 719. When the user performs a channel selection operation as to service, the control unit 717 reads the channel selection information from the NVRAM 719, and controls channel selection processing executed by the tuner 712 based on the channel selection information.

When the SCS is supplied from the signaling information acquisition unit 714 as the signaling information, the control unit 717 controls the filtering processing executed by the filtering processing unit 713 based on the IP address, the port number, the TSI, the TOI and the like provided from the SCS. By the filtering processing, the segment data is supplied to the segment data acquisition unit 715, and the TDO application or the NDO application is supplied to the application engine 716.

The segment data acquisition unit 715 acquires and processes the segment data acquired as a result of the filtering processing by the filtering processing unit 713 or the segment data supplied from the communication unit 722, supplies the audio output unit 720 with the resultant audio data, and supplies the video output unit 721 with the video data. When the segment data is transmitted through the FLUTE session, by connecting to the stream such as audio or video, the segment data stored in the LCT packet is extracted.

The application engine 716 acquires and processes the TDO application or the NDO application acquired as a result of the filtering processing by the filtering processing unit 713, or the TDO application or the NDO application supplied from the communication unit 722, and supplies the video output unit 721 with the resultant video data of the TDO application or the NDO application.

The audio output unit 720 supplies a speaker (not shown) with the audio data supplied from the segment data acquisition unit 715. The speaker outputs voice of a program corresponding to the audio data supplied from the audio output unit 720.

The video output unit 721 supplies a display (not shown) with the video data supplied from the segment data acquisition unit 715. The display displays a video image of a program corresponding to the video data supplied from the video output unit 721. When the video data of the TDO application is supplied from the application engine 716, the video output unit 721 displays and superimposes the video image of the TDO application on the video image of the program. In addition, when the video data of the NDO application is supplied from the application engine 716, the video output unit 721 displays the video image of the NDO application.

The communication unit 722 accesses the data delivery server 30 via the internet 90 according to the control by the control unit 717, and requests for the signaling information. The communication unit 722 receives the signaling information transmitted from the data delivery server 30 via the internet 90, and supplies the signaling information acquisition unit 714 with the signaling information.

The communication unit 722 accesses the data delivery server 30 via the internet 90 according to the control by the control unit 717, and requests for a stream delivery. The communication unit 722 receives the segment data of the stream by streaming delivery from the data delivery server 30 via the internet 90, and supplies the segment data acquisition unit 715 with the segment data.

The communication unit 722 accesses the TPT server 40 via the internet 90 according to the control by the control unit 717, and requests for the TPT. The communication unit 722 receives the TPT transmitted from the TPT server 40 via the internet 90, and supplies the signaling information acquisition unit 714 with the TPT.

The communication unit 722 accesses the application server 50 via the internet 90 according to the control by the control unit 717, and requests for the TDO application or the NDO application. The communication unit 722 receives the TDO application or the NDO application transmitted from the application server 50 via the internet 90, and supplies the application engine 716 with the TDO application or the NDO application.

A storage 723 accumulates the TDO application or the NDO application supplied from the application engine 716. Also, the storage 723 supplies the application engine 716 with the TDO application or the NDO application accumulated by request from the application engine 716.

Although in the reception apparatus 70 in FIG. 17, the audio data and the video data are outputted to external speaker and display, the display and speaker may be included as the television receiver or the like, for example.

Functional Configuration Example of Control Unit

Figure 18:
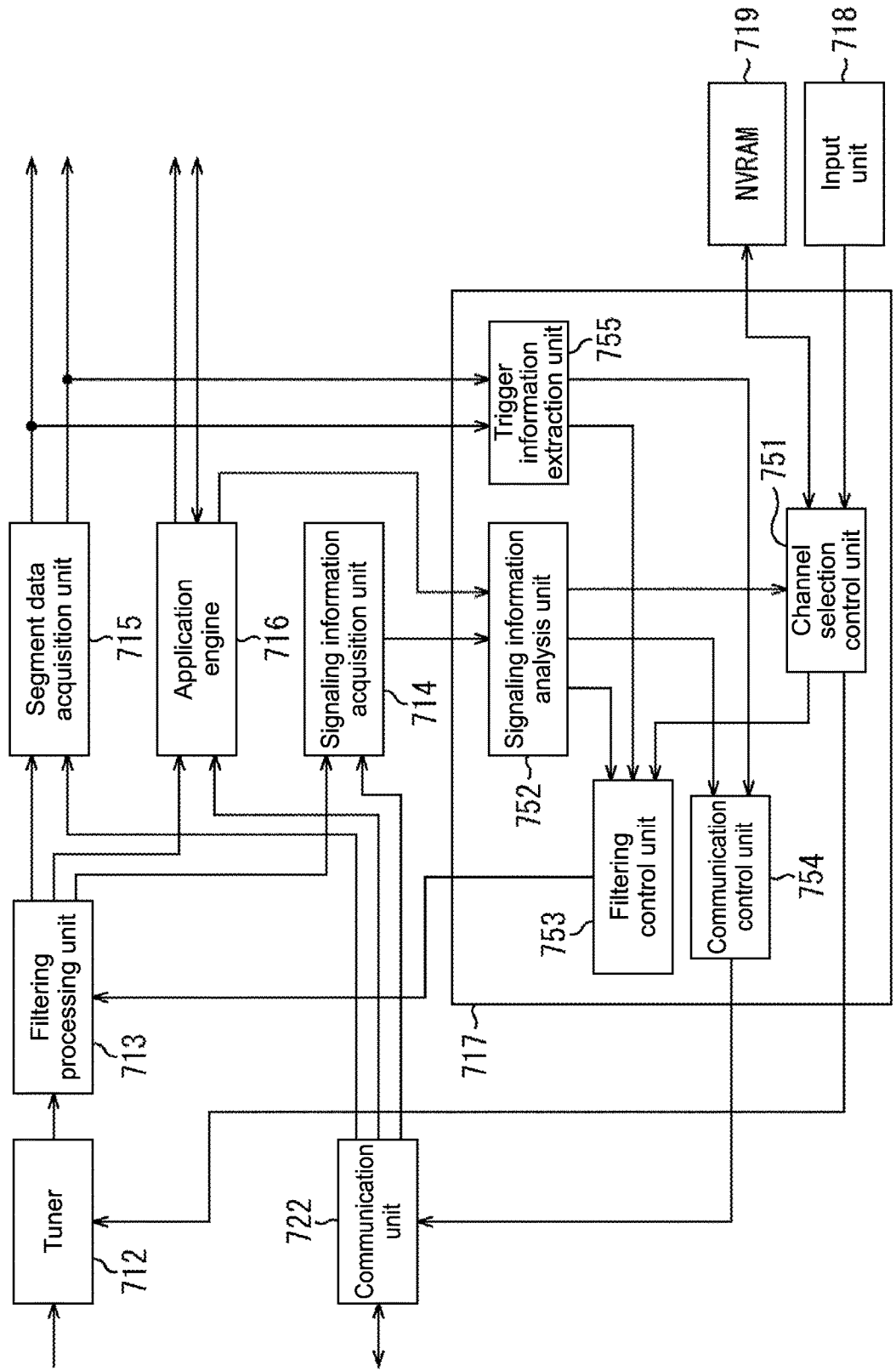
FIG. 18 is a diagram showing a functional configuration example of a control unit.

FIG. 18 is a diagram showing a functional configuration example of parts for controlling the initial scanning processing, the channel selection processing, the filtering processing and the communication processing in the control unit 717 in FIG. 17.

In FIG. 18, the control unit 717 is configured of a channel selection control unit 751, a signaling information analysis unit 752, a filtering control unit 753, a communication control unit 754 and a trigger information extraction unit 755.

The channel selection control unit 751 controls the channel selection processing executed by the tuner 712. The filtering control unit 753 controls the filtering processing executed by the filtering processing unit 713.

At the time of the initial scanning processing, the channel selection control unit 751 controls the tuner 712, and the filtering control unit 753 controls the filtering processing unit 713, thereby acquiring the SCD transmitted as the LLS by the signaling information acquisition unit 714 and supplying the signaling information analysis unit 752 with the SCD. The signaling information analysis unit 752 supplies the channel selection control unit 751 with the channel selection information acquired by analyzing the SCD from the signaling information acquisition unit 714.

The channel selection control unit 751 saves the channel selection information supplied from the signaling information analysis unit 752 to the NVRAM 719. When the user performs the channel selection operation, the channel selection control unit 751 acquires the channel selection information saved in the NVRAM 719. The channel selection control unit 751 controls the channel selection processing executed by the tuner 712 based on the channel selection information. Also, the channel selection control unit 751 supplies the filtering control unit 753 with SCS Bootstrap information of the SCD included in the channel selection information.

The filtering control unit 753 controls the filtering processing executed by the filtering processing unit 713 based on the SCS Bootstrap information supplied from the channel selection control unit 751. In this manner, in the filtering processing unit 713, the filtering processing of the LCT packet of the SCS is executed, thereby acquiring the signaling information (SCS) such as the USD and the MPD from the signaling information acquisition unit 714. The signaling information acquisition unit 714 supplies the signaling information analysis unit 752 with the signaling information (SCS).

The signaling information analysis unit 752 analyzes the signaling information (SCS) supplied from the signaling information acquisition unit 714, and supplies the filtering control unit 753 or the communication control unit 754 with the analyzed result.

Specifically, the signaling information analysis unit 752 specifies the IP address, the port number, the TSI, and the TOI for connecting to the stream and supplies the filtering control unit 753 with them, when the delivery path of the segment data, the TDO application or the NDO application is through broadcasting. Also, the signaling information analysis unit 752 supplies the communication control unit 754 with information (e.g., URL) of the acquisition source, when the delivery path of the segment data, the TDO application or the NDO application is through communication.

The filtering control unit 753 controls the filtering processing executed by the filtering processing unit 713 based on the IP address, the port number, the TSI, and the TOI supplied from the signaling information analysis unit 752. In this manner, in the filtering processing unit 713, the filtering processing of the LCT packet of the segment data is executed, the resultant segment data is supplied to the segment data acquisition unit 715. Also, in the filtering processing unit 713, the filtering processing of the LCT packet of the TDO application or the NDO application is executed, and the resultant TDO application or NDO application is supplied to the application engine 716.

The communication control unit 754 controls the communication processing executed by the communication unit 722 based on the information (e.g., URL) of the acquisition source supplied from the signaling information analysis unit 752. In this manner, the communication unit 722 receives the segment data streaming delivered from the data delivery server 30 via the internet 90, which is supplied to the segment data acquisition unit 715. Also, the communication unit 722 receives the TDO application or the NDO application delivered from the application server 50 via the internet 90, which is supplied to the application engine 716.

The trigger information extraction unit 755 always monitors the stream such as audio, video and captions acquired by the segment data acquisition unit 715, and extracts the trigger information buried into the stream, which is supplied to the filtering control unit 753 or the communication control unit 754.

The filtering control unit 753 controls the filtering processing executed by the filtering processing unit 713 based on the trigger information supplied from the trigger information extraction unit 755. In this manner, the filtering processing unit 713 executes the filtering processing of the LCT packet of the SCS, and the signaling information such as the TPT is acquired by the signaling information acquisition unit 714. The signaling information acquisition unit 714 supplies the signaling information analysis unit 752 with the signaling information (SCS) such as the TPT.

The communication control unit 754 controls the communication processing executed by the communication unit 722 based on the URL included in the trigger information from the trigger information extraction unit 755. In this manner, the communication unit 722 receives the TPT delivered from the TPT server 40 via the internet 90, which is supplied to the signaling information analysis unit 752 via the signaling information acquisition unit 714.

When the NRT entry point configuring the NDO application is acquired, the application engine 716 supplies the signaling information analysis unit 752 with the NRT entry point. In this manner, the signaling information analysis unit 752 analyzes the NRT entry point, and confirms that the delivery path of the NRT resource is through broadcasting or communication.

<5. Processing Flow in Each Apparatus>

Next, referring to flow charts in FIG. 19 to FIG. 24, a processing flow of executed by each apparatus configuring a broadcasting communication system in FIG. 14.

(Digital Broadcasting Signal Transmission Processing)

Figure 19:
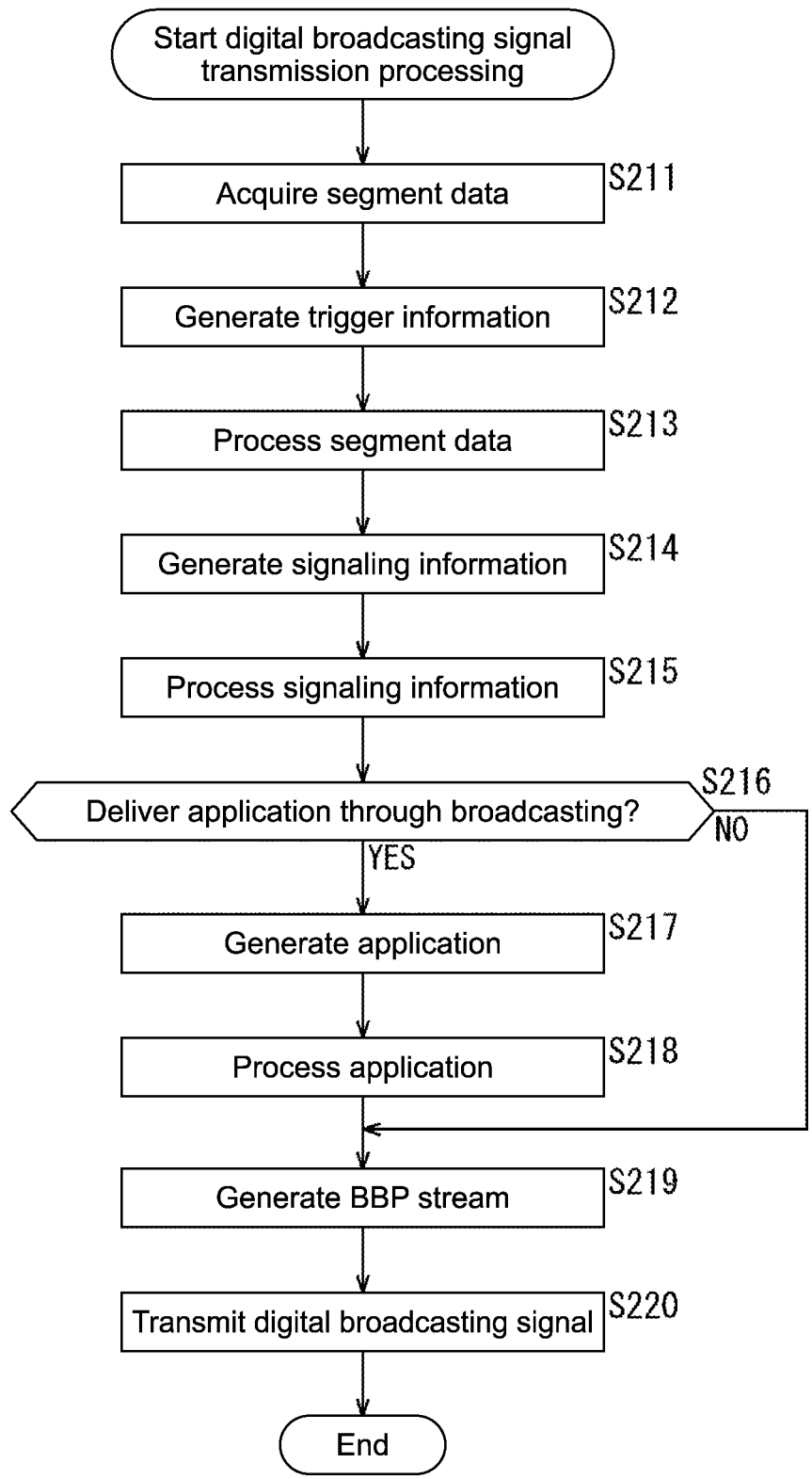
FIG. 19 is a flow chart for explaining a flow of digital broadcasting signal transmission processing.

Firstly, referring to the flow chart in FIG. 19, a flow of digital broadcasting signal transmission processing executed by the transmission apparatus 20 in FIG. 14 will be described.

In Step S211, the segment data acquisition unit 212 acquires the segment data from the data offering server 10, and supplies the segment data processing unit 214 with the segment data. In Step S212, the trigger information generation unit 213 generates the trigger information, and supplies the segment data processing 14 with the trigger information.

In Step S213, the segment data processing unit 214 processes the trigger information supplied from the segment data acquisition unit 212, and supplies the multiplexer unit 219 with the stream provided thereby. The segment data processing unit 214 buries the trigger information supplied from the trigger information generation unit 213 into the stream such as audio, video and captions.

In Step S214, the signaling information generation unit 215 generates the signaling information based on the original data of the signaling information supplied from the data offering server 10, and supplies the signaling information processing unit 216 with the signaling information. In Step S215, the signaling information processing unit 216 processes the signaling information supplied from the signaling information generation unit 215, and supplies the multiplexer unit 219 with the signaling information.

In Step S216, it is determined whether or not the application is transmitted through broadcasting. When the application is transmitted through broadcasting, the process proceeds to Step S217. In Step S217, the application generation unit 217 generates the TDO application or the NDO application, and supplies the application processing unit 218 with the TDO application or the NDO application. In Step S218, the application processing unit 218 processes the TDO application or the NDO application supplied from the application generation unit 217, and supplies the multiplexer unit 219 with the TDO application or the NDO application.

In Step S216, when it is determined that the application is not delivered through broadcasting, the processes in Steps S217 and S218 are skipped, and the process proceeds to Step S219.

In Step S219, the multiplexer unit 219 multiplexes the stream such as audio, video and captions from the segment data processing unit 214 and the signaling information from the signaling information processing unit 216, generates the BBP stream, and supplies the transmission unit 220 with the BBP stream. When it is determined that the application is delivered through broadcasting in the determination processing in Step S216, the multiplexer unit 219 further multiplexes the TDO application or the NDO application supplied from the application processing unit 218, and generates the BBP stream.

In Step S220, the transmission unit 220 modulates the BBP stream from the multiplexer unit 219, and transmits the BBP stream in a digital broadcasting signal via the antenna 221. At this time, the segment data of audio or video and the files of the SCS are transmitted through the FLUTE session by the broadcasting wave of the digital broadcasting using the IP transmission method. When the processing in Step S220 is ended, the digital broadcasting signal transmission processing in FIG. 19 is ended.

As above, the digital broadcasting signal transmission processing is described.

(TPT Provision Processing)

Figure 20:
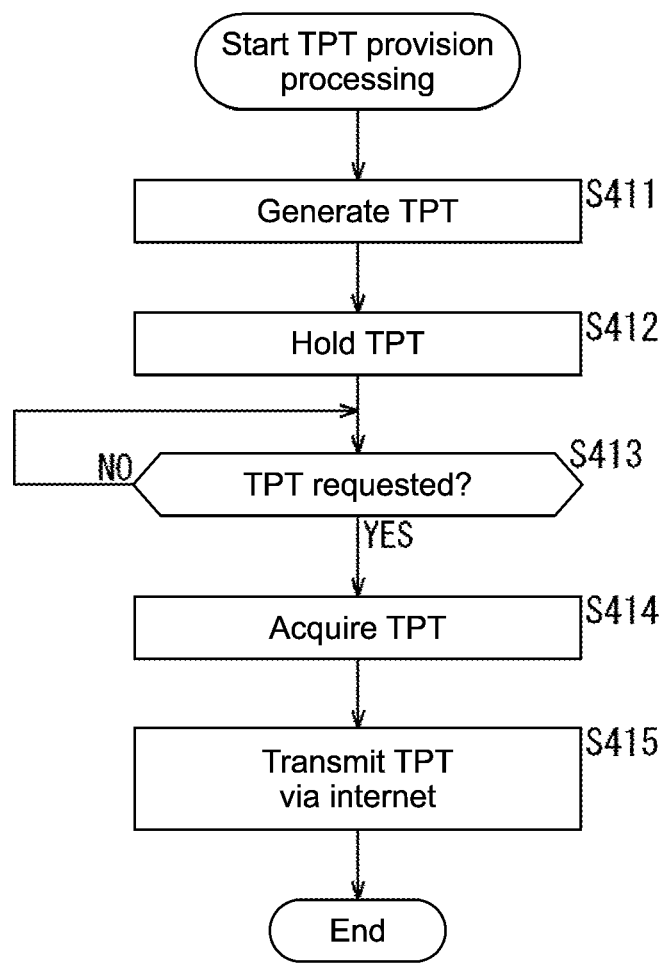
FIG. 20 is a flow chart for explaining a flow of TPT provision processing.

Next, referring to a flow chart in FIG. 20, a flow of the TPT provision processing executed by the TPT server 40 in FIG. 14 will be described.

In Step S411, the TPT generation unit 412 generates the TPT according to the control by the control unit 411, and supplies the TPT holding unit 413 with the TPT. In Step S412, the TPT holding unit 413 holds the TPT supplied from the TPT generation unit 412.

In Step S413, the control unit 411 always monitors a communication status of the communication unit 414 to determine whether or not the TPT is requested from the reception apparatus 70. In Step S413, when it is determined that the TPT is not requested from the reception apparatus 70, the determination processing in Step S413 is repeated. The process proceeds to Step S414 while waiting that the TPT is requested from the reception apparatus 70 in Step S413.

In Step S414, the communication unit 414 acquires the TPT held in the TPT holding unit 413 according to the control by the control unit 411. In Step S415, the communication unit 414 transmits the TPT acquired by the processing in Step S414 according to the control by the control unit 411 to the reception apparatus 70 via the internet 90. When the processing in Step S415 is ended, the TPT provision processing in FIG. 20 is ended.

As above, the TPT provision processing is described.

(Application Provision Processing)

Figure 21:
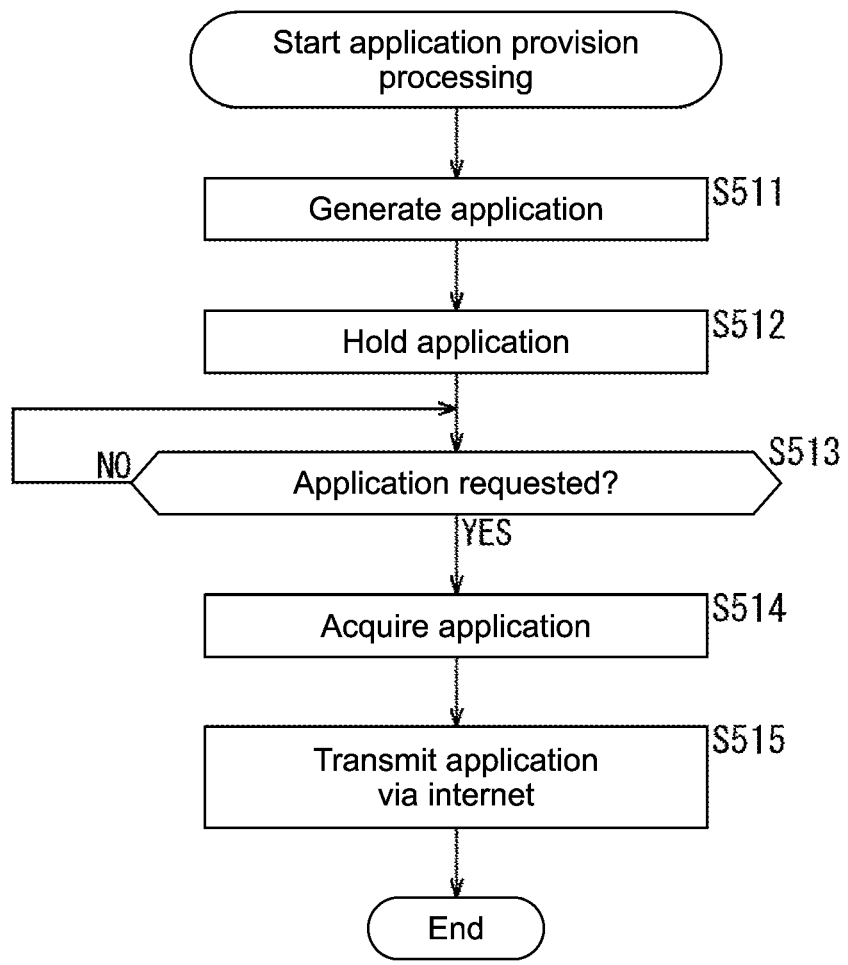
FIG. 21 is a flow chart for explaining a flow of application provision processing.

Next, referring to a flow chart in FIG. 21, a flow of the application provision processing executed by the application server 50 in FIG. 14 will be described.

In Step S511, the application generation unit 512 generates the TDO application or the NDO application (NRT resource) according to the control by the control unit 511, and supplies the application holding unit 513 with the TDO application or the NDO application. In Step S512, the application holding unit 513 holds the TDO application or the NDO application supplied from the application generation unit 512.

In Step S513, the control unit 511 always monitors the communication status of the communication unit 514 to determine whether or not the TDO application or the NDO application is requested from the reception apparatus 70. In Step S513, when it is determined that the application is not requested from the reception apparatus 70, the determination processing in Step S513 is repeated. The process proceeds to Step S514 while waiting that the TDO application or the NDO application is requested from the reception apparatus 70 in Step S513.

In Step S514, the communication unit 514 acquires the TDO application or the NDO application held in the application holding unit 513 according to the control by the control unit 511. In Step S515, the communication unit 514 transmits the TDO application or the NDO application acquired by the processing in Step S514 according to the control by the control unit 511 to the reception apparatus 70 via the internet 90. When the processing in Step S515 is ended, the application provision processing in FIG. 21 is ended.

As above, the application provision processing is described.

(Basic Service Processing)

Next, referring to a flow chart in FIG. 22, a flow of a basic service processing executed by the reception apparatus 70 in FIG. 14 will be described. The basic service processing in FIG. 22 corresponds to the operation example of the basic service in FIG. 6.

In Step S711, the tuner 712, the filtering processing unit 713 and the like perform the initial scanning processing according to the control by the channel selection control unit 751 and the filtering control unit 753. By the processing scanning processing, the SCD that is transmitted as the LLS is acquired, which is saved in the NVRAM s719 as the channel selection information (S712).

In Step S713, it is determined whether or not the user performs the channel selection operation. In Step S713, when it is determined that the channel selection operation is not performed, the determination processing in Step S713 is repeated. Specifically, the processing proceeds to Step S714 while waiting the channel selection operation by the user in Step S713.

In Step S714, the channel selection control unit 751 acquires the channel selection information saved in the NVRAM 719, and supplies the filtering control unit 753 with the channel selection information. Here, as the SCD saved as the channel selection information includes the SCS Bootstrap information, the address of the SCS of the service channel-selected is specified.

In Step S715, the filtering processing unit 713 performs the filtering processing of the LCT packet of the SCS according to the control by the filtering control unit 753. By performing the filtering processing, it is connected to the FLUTE session of the SCS to acquire the LCT packet of the SCS.

In Step S716, the signaling information acquisition unit 714 analyzes the LCT packet from the filtering processing unit 713, acquires the signaling information (SCS) such as the USD and the MPD, and supplies the signaling information analysis unit 752 with the SCS.

In Step S717, the signaling information analysis unit 752 analyzes the signaling information (SCS) such as the USD and the MPD acquired in the processing in Step S716, and matches the URL specified in the SegmentURL element of the MPD with the URL specified in the basepattern element of the deliveryMethod element of the USD.

In Step S718, the signaling information analysis unit 752 confirms that the delivery path of the audio or video stream listed in the Representation element of the MPD is through broadcasting or communication according to the result of the matching in Step S717 (S718). Specifically, the similar processing as the "procedure 7" in the operation example of the basic service in FIG. 6 described above is performed here to perform an address resolution of broadcasting and communication.

In Step S719, according to the result of the processing in Step S718, it is determined that the delivery path of the audio or video stream is through broadcasting or communication.

In Step S719, when it is determined that the delivery path of the stream is through broadcasting, the process proceeds to Step S720. In Step S720, the signaling information analysis unit 752 specifies the IP address, the port number, the TSI and the TOI for connecting to the audio or video stream based on the signaling information such as the FDD and the SDP acquired by the processing in Step S716, which are supplied to the filtering control unit 753.

In Step S721, the filtering processing unit 713 performs the filtering processing of the LCT packet of the segment data according to the control by the filtering control unit 753. By performing the filtering processing, it is connected to the FLUTE session of the intended service to acquire the audio or video LCT packet.

In Step S722, the segment data acquisition unit 715 analyzes the LCT packet from the filtering processing unit 713, acquires the segment data, and supplies the audio output unit 720 with the audio data and the video output unit 721 with the video data.

On the other hand, in Step S719, when it is determined that the delivery path of the stream is through communication, the process proceeds to Step S723. In Step S723, the communication unit 722 accesses the data delivery server 30 via the internet 90 according to the control by the communication control unit 754, and receives the segment data of the stream delivered by streaming delivery.

Then, the segment data acquisition unit 715 acquires the segment data from the communication unit 722, and supplies the audio the output unit 720 with the audio data and the video output unit 721 with the video data.

When the processing in Step S722 or Step S723 is ended, the process proceeds to Step S724.

The audio the output unit 720 performs buffering of the audio data from the segment data acquisition unit 715 (S724), and further performs rendering (S725). In addition, the video output unit 721 performs buffering of the video data from the segment data acquisition unit 715 (S724), further performs rendering (S725). In this manner, in the reception apparatus 70, video image and voice corresponding to the service channel-selected by the user are reproduced.

When the processing in Step S725 is ended, the process proceeds to Step S726, and it is determined whether or not a predetermined event is generated. In Step S726, when it is determined that the predetermined event is not generated, the process proceeds to Step S727, according to the result of the processing in Step S718, it is determined that the delivery path of the audio or video stream is through broadcasting or communication.

In Step S727, when it is determined that the delivery path of the stream is through broadcasting, the process proceeds to Step S721. Then, by repeating the processing in Step S721 or later, the video image and voice corresponding to the segment data transmitted through broadcasting are reproduced. In Step S727, when it is determined that the delivery path of the stream is through communication, the process proceeds to Step S723. Then, by repeating the processing in Step S723 or later, the video image and voice corresponding to the segment data transmitted through communication are reproduced.

Figure 22:
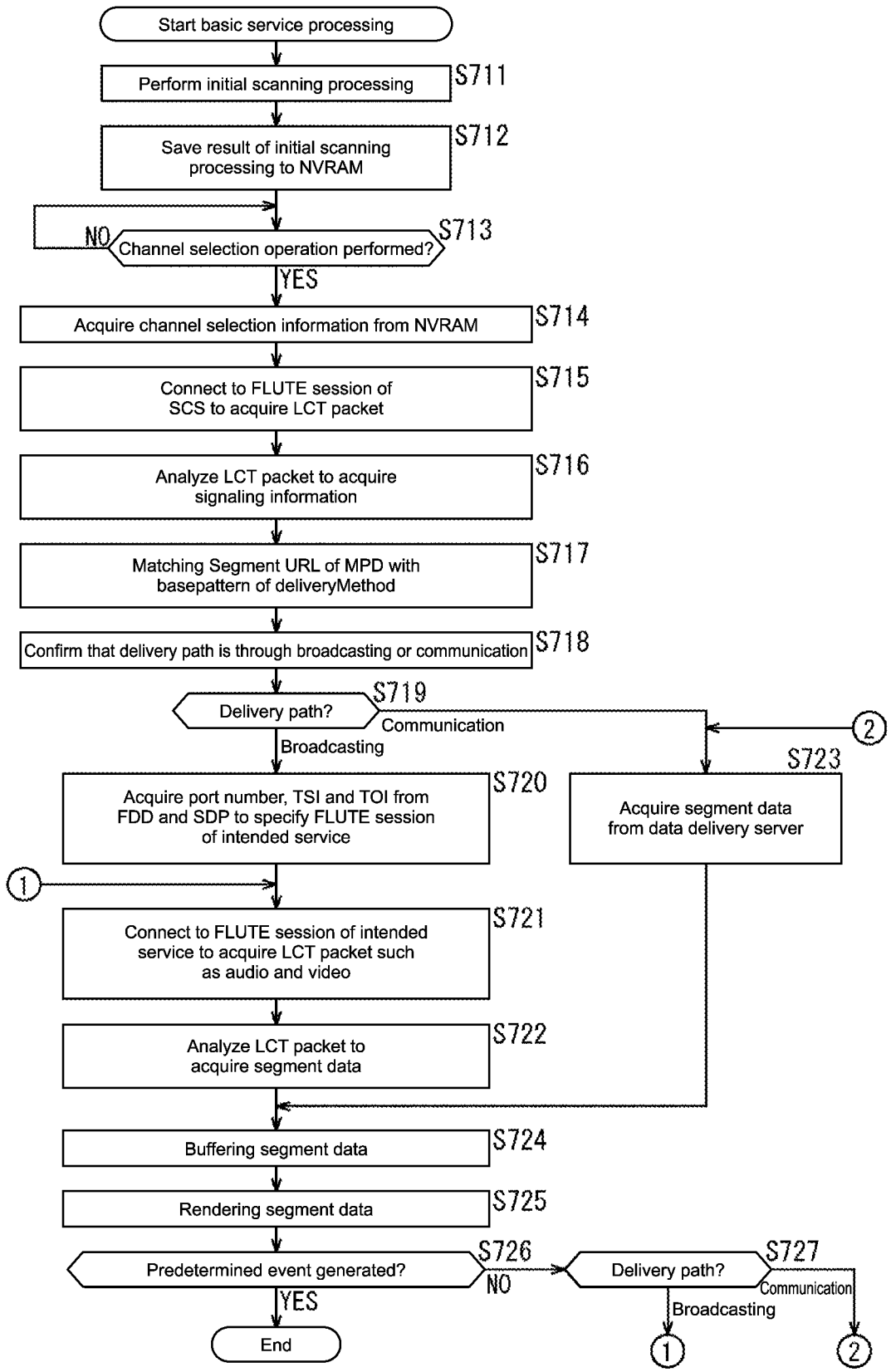
FIG. 22 is a flow chart for explaining a flow of basic service processing.

Then, in Step S726, when the predetermined event is generated, e.g., the reception apparatus 70 is turned off, the basic service processing in FIG. 22 is ended.

As above, the basic service processing is described.

(Associated NRT Handling Processing)

Figure 23:
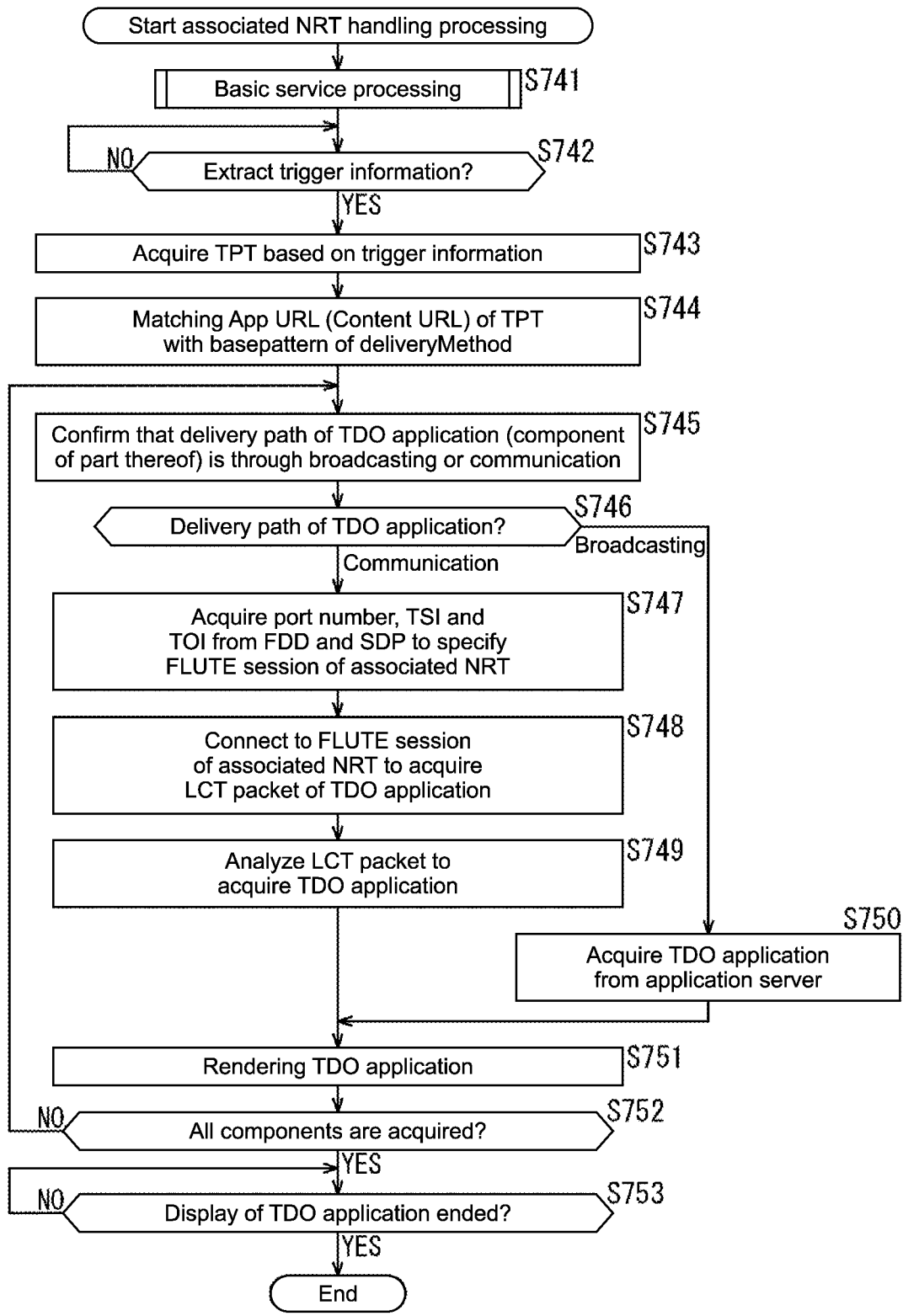
FIG. 23 is a flow chart for explaining a flow of associated NRT handling processing.

Next, referring to a flow chart in FIG. 23, a flow of associated NRT handling processing executed by the reception apparatus 70 in FIG. 14 will be described.

In Step S741, the basic service processing in FIG. 22 is executed, in the reception apparatus 70, video image and voice corresponding to the service channel-selected by the user are reproduced.

In Step S742, the trigger information extraction unit 755 always monitors the stream such as audio, video and captions, and determines whether or not the trigger information buried into the stream is extracted. The process proceeds to Step S743 while waiting that the trigger information is extracted in Step S742.

In Step S743, the filtering processing unit 713 performs filtering processing of the LCT packet of the SCS according to the control by the control unit 753. The signaling information acquisition unit 714 analyzes the LCT packet from the filtering processing unit 713, acquires the signaling information (SCS) such as the TPT and the USD, and supplies the signaling information analysis unit 752 with the SCS.

The timing to acquire the TPT is when the trigger information included in the stream is extracted. Alternatively, the TPT may be acquired at the timing when the TPT newly appears or when the TPT is updated, which is found by monitoring always the SCS transmitted through the FLUTE session, for example.

When the TPT is transmitted not through broadcasting, but through communication, the communication control unit 754 controls the communication unit 722 according to the URL included in the trigger information from the trigger information extraction unit 755, and accesses the TPT server 40 via the internet 90. Then, the trigger information transmitted from the TPT server 40 is received by the communication unit 722, and is supplied to the signaling information analysis unit 752 via the signaling information acquisition unit 714.

In Step S744, the signaling information analysis unit 752 matches the URL (AppURL, ContentURL) showing the acquisition source of the TDO application described to the TPT and the URL specified in the basepattern element in the broadcastAppService element or the unicastAppService element within the deliveryMethod element of the USD.

In Step S745, according to the result of the matching in Step S744, the signaling information analysis unit 752 determines that the delivery path of the TDO application listed in the TPT is through broadcasting or communication. Specifically, the similar processing as the "procedure 18" in the operation example of the associated NRT in FIGS. 7 to 10 described above is performed here to perform an address resolution of broadcasting and communication.

When the TDO application is configured of a plurality of components, these components may have different acquisition sources. Therefore, the URL of the basepattern element is matched per URL of the components (ContentURL).

In Step S746, according to the result of the processing in Step S745, it is determined that the delivery path of the TDO application is through broadcasting or communication.

In Step S746, when the delivery path of the TDO application is determined as through broadcasting, the process proceeds to Step S747. In Step S747, the signaling information analysis unit 752 specifies the IP address, the port number, the TSI, and the TOI for connecting to the stream of the associated NRT based on the signaling information such as the FDD and the SDP acquired by the processing in Step S743, which are supplied to the filtering control unit 753.

When the stream of the associated NRT that transmits the TDO application is transmitted as the same service as the main service as in the operation example 1 of the associated NRT in FIG. 7, the SCS of the main service can be used. When the stream of the associated NRT is transmitted as other service (NRT service) different from the main service as in the operation example of the associated NRT in FIG. 8 to FIG. 10, the SCS for the NRT service is necessary to acquire.

In this case, the association tag attribute within the broadcastAppService element of the deliveryMethod element of the USD is associated with the triplet of the SPD, thereby providing the SCS Bootstrap information of the NRT service. Then, once the SCS of the NRT service is acquired, the IP address, the port number, the TSI, and the TOI for connecting to the stream of the associated NRT can be specified.

In Step S748, the filtering processing unit 713 performs filtering processing of the LCT packet of the TDO application according to the control by the filtering control unit 753. By performing the filtering processing, it is connected to the FLUTE session of the NRT stream thereby acquiring the LCT packet of the TDO application.

In Step S749, the application engine 716 analyzes the LCT packet from the filtering processing unit 713, acquires and executes the TDO application, and supplies the video output unit 721 with the video data.

On the other hand, in Step S746, when the delivery path of the stream is determined as through communication, the process proceeds to Step S750. In Step S750, the communication unit 722 accesses the application server 50-1 according to the control by the communication control unit 754 via the internet 90, and receives the TDO application. Then, the application engine 716 acquires and executes the TDO application from the communication unit 722, and supplies the video output unit 721 with the video data.

When the processing in Step S749 or Step S750 is ended, the process proceeds to Step S751. In Step S751, the video output unit 721 performs rendering of the video data supplied from the application engine 716.

In Step S752, when the TDO application is configured of a plurality of components, it is determined whether or not all components are acquired. In Step S752, when it is determined that all components are not acquired processing, it returns to Step S745, the processing thereafter is repeated.

Specifically, processing from Step S745 to S752 is repeated until all components transmitted through broadcasting or communication are acquired. In Step S752, when it is determined that all components are acquired, the process proceeds to Step S753. In this manner, in the reception apparatus 70, the TDO application is executed in conjunction with the program, and the video image of the program is superimposed with and displayed on the video image of the TDO application.

In Step S753, it is determined whether or not the end of displaying the TDO application is designated by the user. In Step S753, when it is determined that the end of displaying the TDO application is not designated, the determination processing in Step S753 is repeated. In this case, the execution of the TDO application is continued, the video image continues to be displayed, superimposing with the video image of the program.

On the other hand, in Step S753, when it is determined that the end of displaying the TDO application is designated, the TDO application is ended. The associated NRT handling processing in FIG. 23 is ended.

As above, the associated NRT handling processing is described. In the associated NRT handling processing, the TDO application (components of a part thereof) delivered through broadcasting or communication is acquired based on the signaling information transmitted through the SCS, and is executed in conjunction with the AV contents such as the program.

The TDO application is generally configured of monomedia such as a plurality of applications, still images and text files. The components of the elements configuring the TDO application (for example, subapplications, monomedia) are divided and transmitted from different delivery sources by any delivery paths through broadcasting or communication. In this manner, a data size of the TDO application transmitted through broadcasting is made small, whereby a broadcasting band necessary for the transmission of the TDO application can be reduced.

For example, while an entry application and its related files as a main part of the TDO application are transmitted through broadcasting, sub and lower applications that are not frequently used are transmitted through communication. In this manner, the data size of the TDO application can be reduced.

The elements configuring the TDO application may be divided into a plurality of components, which are delivered via different delivery paths. One associated NRT service can be used differently. For example, basic components are delivered through broadcasting, and optional components are delivered through communication. In this manner, in the associated NRT service, it is possible to provide additional services. For example, free service is delivered through broadcasting, but charged service for registered members is delivered through communication.

(Stand-Alone NRT Handling Processing)

Figure 24:
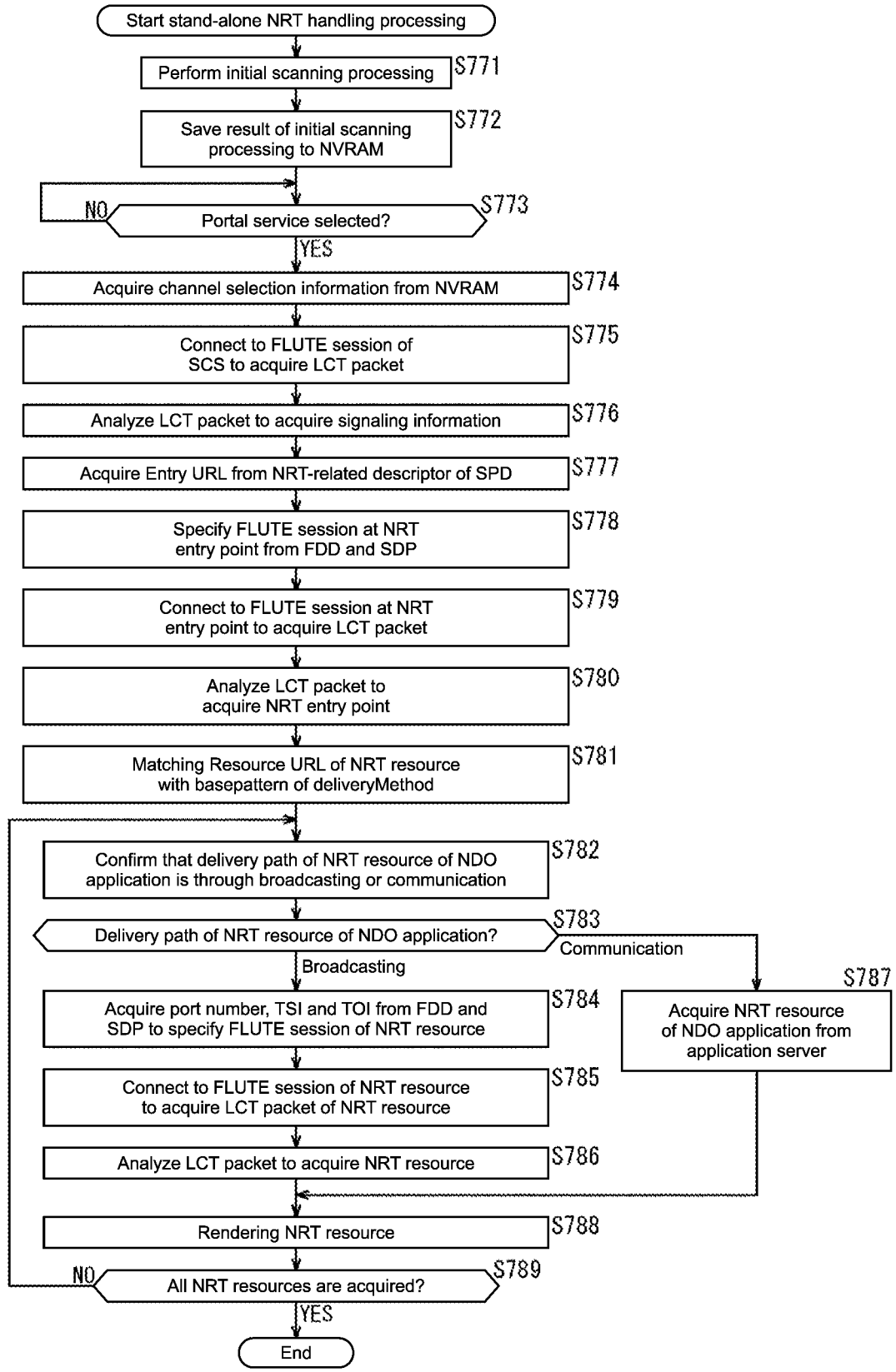
FIG. 24 is a flow chart for explaining a flow of stand-alone NRT handling processing.

Finally, referring to a flow chart in FIG. 24, a flow of stand-alone NRT handling processing executed by the reception apparatus 70 in FIG. 14 will be described.

In Step S771, the tuner 712, the filtering processing unit 713 and the like perform the initial scanning processing according to the control by the channel selection control unit 751 and the filtering control unit 753. By the processing scanning processing, the SCD transmitted as the LLS is acquired, and is saved in the NVRAM 719 as the channel selection information (S772).

In Step S773, it is determined whether or not the portal service is selected by the user. In Step S773, when it is determined that the portal service is not selected, the determination processing in Step S773 is repeated. In other words, the process proceeds to Step S774 while waiting that the portal service is selected by the user in Step S773.

In Step S774, the channel selection control unit 751 acquires the channel selection information saved in the NVRAM 719, and supplied the filtering control unit 753 with the channel selection information. Here, as the SCD saved as the channel selection information includes the SCS Bootstrap information, the address of the SCS of the portal service selected (channel-selected) is specified using this.

In Step S775, the filtering processing unit 713 performs filtering of the LCT packet of the SCS according to the control by the filtering control unit 753. By performing the filtering processing, it is connected to the FLUTE session of the SCS to acquire the LCT packet of the SCS.

In Step S776, the signaling information acquisition unit 714 analyzes the LCT packet from the filtering processing unit 713, acquires the signaling information (SCS) such as the USD, the SDP, the FDD and the SPD, and supplies the signaling information analysis unit 752 with the SCS.

In Step S777, the signaling information analysis unit 752 acquires the URL (Entry URL) of the NRT entry point described in the NRT related descriptor (NRT Service Description) of the SPD. In Step S778, the signaling information analysis unit 752 specifies the IP address, the port number, the TSI and the TOI for connecting to the FLUTE session at the NRT entry point based on the signaling information such as the FDD and the SDP, and supplies the filtering control unit 753 with the signaling information.

In Step S779, the filtering processing unit 713 performs the filtering processing of the LCT packet of the NRT entry point according to the control by the filtering control unit 753. By performing the filtering processing, it is connected to the FLUTE session of the NRT entry point to acquire the LCT packet of the NRT entry point.

In Step S780, the application engine 716 analyzes the LCT packet from the filtering processing unit 713, acquires the file of the NRT entry point (e.g., Index.html), and supplies the signaling information analysis unit 752 with the file.

In Step S781, the signaling information analysis unit 752 matches the URL (ResourceURL) of the NRT resource described in the NRT entry point with the URL of the basepattern element within the broadcastAppService element or the unicastAppService element of the deliveryMethod element of the USD.

In Step S782, the signaling information analysis unit 752 confirms that the delivery path of the NRT resource listed in the NRT entry point is through broadcasting or communication according to the result of the matching in Step S781. Specifically, the similar processing as the "procedure 11" in the operation example 1 of the stand-alone NRT in FIG. 11 described above is performed here to perform an address resolution of broadcasting and communication.

When a plurality of NRT resources are listed in the NRT entry point, the NRT resources may have different acquisition sources. Therefore, the URL of the basepattern element is matched per URL of the NRT resources (ResourceURL).

In Step S783, according to the result of the processing in Step S782, it is determined that the delivery path of the NRT resource is through broadcasting or communication.

In Step S783, when it is determined that the delivery path of the NRT resource is through broadcasting, the process proceeds to Step S784. In Step S784, the signaling information analysis unit 752 specifies the IP address, the port number, the TSI, and the TOI for connecting to the stream of the associated NRT based on the signaling information such as the FDD and the SDP acquired by the processing in Step S776, which are supplied to the filtering control unit 753.

In Step S785, the filtering processing unit 713 performs filtering processing of the LCT packet of the NRT resource according to the control by the filtering control unit 753. By performing the filtering processing, it is connected to the FLUTE session of the NRT resource to acquire the LCT packet of the NRT resource.

In Step S786, the application engine 716 analyzes the LCT packet from the filtering processing unit 713, acquires and executes the NRT resource, and supplies the video output unit 721 with the video data.

On the other hand, in Step S783, when it is determined that the delivery path of the NRT resource through communication, the process proceeds to Step S787. In Step S787, the communication unit 722 accesses the application server 50-2 according to the control by the communication control unit 754 via the internet 90, and receives the NRT resource of the NDO application. Then, the application engine 716 acquires and executes the NRT resource from the communication unit 722, and supplies the video output unit 721 with the video data.

When the processing in Step S786 or Step S787 is ended, the process proceeds to Step S788. In Step S788, the video output unit 721 performs rendering of the video data supplied from the application engine 716.

In Step S789, when the plurality of NRT resources are listed in the NRT entry point, it is determined whether or not all NRT resources are acquired. In Step S789, when it is determined that all NRT resources are not acquired, it returns to Step S782, the processing thereafter is repeated.

Specifically, processing from Step S782 to S789 is repeated until all NRT resources transmitted through broadcasting or communication are acquired. In Step S789, when it is determined that all NRT resources are acquired, the video image of the NDO application corresponding to the portal service selected by the user is displayed on the reception apparatus 70. When the processing in Step S789 ("YES" in S789) is ended, the stand-alone NRT handling processing in FIG. 24 is ended.

As above, the stand-alone NRT handling processing is described. In the stand-alone NRT handling processing, the NDO application (NRT resource) transmitted through broadcasting or communication is acquired based on the signaling information transmitted through the SCS, and is executed as independent broadcasting service.

The one or plurality of NRT resources configuring the NDO application may be divided and transmitted from different delivery sources by any delivery paths through broadcasting or communication. In this manner, a data size of the NDO application transmitted through broadcasting is made small, whereby a broadcasting band necessary for the transmission of the NDO application can be reduced. For example, while an NRT point and its related files as a main part of the NDO application are transmitted through broadcasting, the NRT resources that are not frequently used are transmitted through communication. In this manner, the data size of the NDO application can be reduced.

The elements configuring the NDO application may be divided into a plurality of components, which are delivered via different delivery paths. One stand-alone NRT service can be used differently. For example, basic NRT resources are delivered through broadcasting, and optional NRT resources are delivered through communication. In this manner, in the stand-alone NRT service, it is possible to provide additional services. For example, free service is delivered through broadcasting, but charged service for registered members is delivered through communication.

In the description above, as a name of the signaling information, "D" that is an abbreviation of Description is used, but "T" that is an abbreviation of Table may be used. For example, the SCD (Service Configuration Description)

may be described as SCT (Service Configuration Table). Also, for example, the SPD (Service Parameter Description) may be described as SPT (Service Parameter Table). However, a difference among the names is a formal difference between "Description" and "Table", but a content in each signaling information is not substantially different.

<6. Configuration of Computer>

Figure 25:
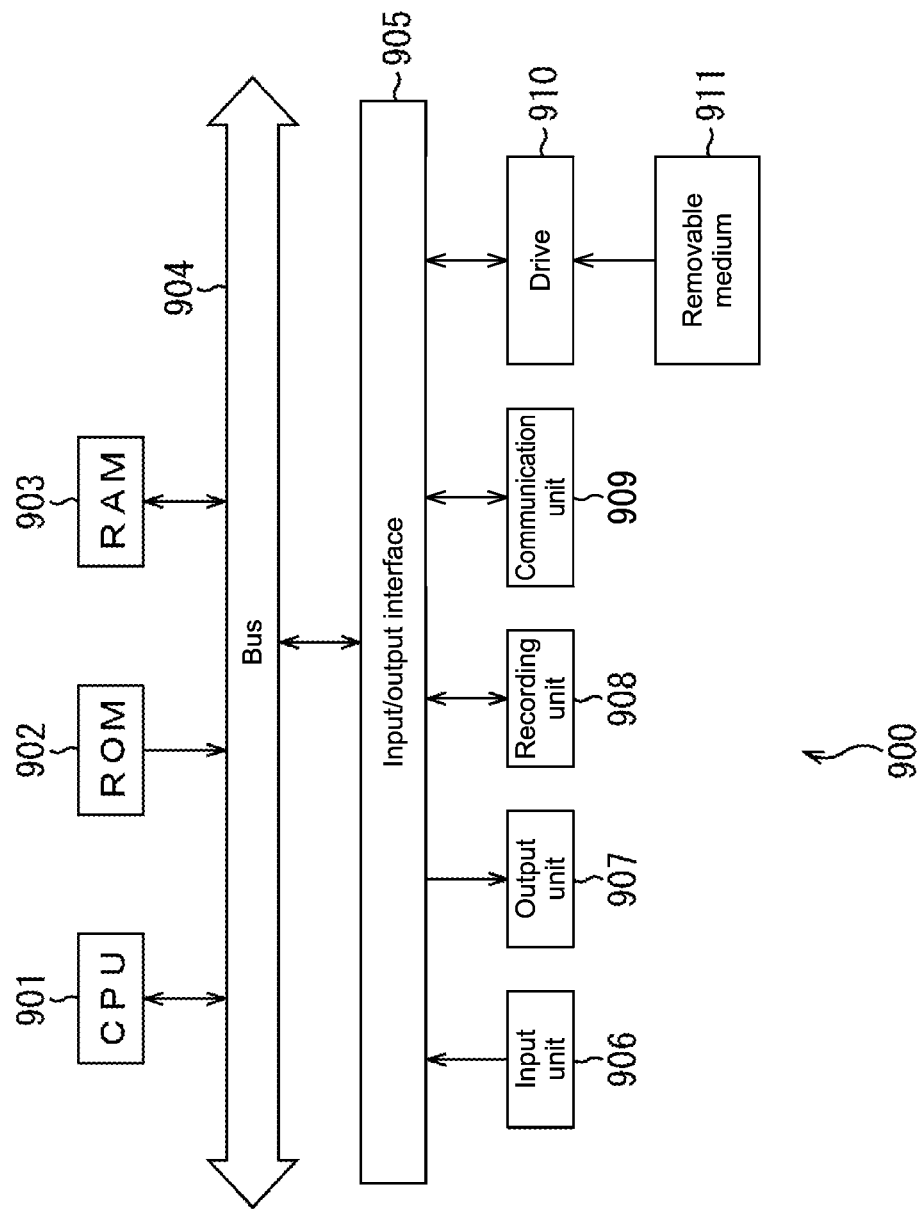
FIG. 25 is a diagram showing a configuration example of a computer.

The above-mentioned series of processing may be executed by hardware or may be executed by software. If the series of processing is executed by software, programs configuring that software are installed into a computer. FIG. 25 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

It should be noted that the present technology may take the following configurations.

(1) A reception apparatus, including:
a channel selection control unit that performs a channel selection control of channel-selecting digital broadcasting using an IP (Internet Protocol) transmission method;
an acquisition control unit that controls acquisition of an application delivered through broadcasting or communication in the digital broadcasting based on signaling information transmitted at a layer higher than an IP layer in a protocol layer of the IP transmission method; and
an application execution unit that executes the application acquired.

(2) The reception apparatus according to (1), in which the application is executed in conjunction with an AV content provided as broadcasting service in the digital broadcasting.

(3) The reception apparatus according to (2), in which the application is provided as a service same as or different from the broadcasting service.

(4) The reception apparatus according to (2) or (3), in which
the acquisition control unit controls acquisition of the application based on control information of the application delivered through broadcasting or communication and the signaling information when trigger information for starting the application transmitted through the digital broadcasting is extracted.

(5) The reception apparatus according to any one of (2) to (4), in which
the application is configured of a plurality of components, and
the acquisition control unit controls acquisition of the plurality of components delivered through broadcasting or communication.

(6) The reception apparatus according to (3), in which the signaling information includes information for acquiring signaling information of another service when the application is provided as the another service.

(7) The reception apparatus according to (1), in which the application is provided as independent broadcasting service in the digital broadcasting.

(8) The reception apparatus according to (7), in which the application is configured of an entry point and one or a plurality of resources, and
the acquisition control unit controls acquisition of the one or plurality of resources delivered through broadcasting or communication based on a URL (Uniform Resource Locator) of the one or plurality of resources included in the entry point and the signaling information.

(9) The reception apparatus according to (8), in which the signaling information includes a URL of the entry point, and
the acquisition control unit acquires the entry point based on the URL of the entry point.

(10) A reception method for a reception apparatus, including the steps of:
performing a channel selection control to channel-select digital broadcasting using an IP transmission method;
controlling acquisition of an application delivered through broadcasting or communication in the digital broadcasting based on signaling information transmitted at a layer higher than an IP layer in a protocol layer of the IP transmission method; and
executing the application acquired.

(11) A transmission apparatus, including: an acquisition unit that acquires a stream provided as broadcasting service; a signaling information generation unit that generates signaling information including control information used in an acquisition control of an application delivered through broadcasting or communication; and a transmission unit that transmits the signaling information generated together with the stream in a broadcasting wave of digital broadcasting using an IP transmission method, the signaling information being transmitted at a layer higher than an IP layer in a protocol layer of the IP transmission method in the digital broadcasting.

(12) The transmission apparatus according to (11), in which the application is executed in conjunction with an AV content provided as broadcasting service in the digital broadcasting.

(13) The transmission apparatus according to (12), in which the application is provided as a service same as or different from the broadcasting service.

(14) The transmission apparatus according to (13), in which the signaling information includes information for acquiring signaling information of another service when the application is provided as the another service.

(15) The transmission apparatus according to (11), in which the application is provided as independent broadcasting service in the digital broadcasting.

(16) The transmission apparatus according to (15), in which the application is configured of an entry point and one or a plurality of resources, and the entry point includes a URL of the one or plurality of resources.

(17) The transmission apparatus according to (16), in which the signaling information includes the URL of the entry point.

(18) The transmission apparatus according to any one of (11) to (17), further including:

an application generation unit that generates the application, in which the transmission unit transmits the application generated as the stream.

(19) The transmission apparatus according to any one of (11) to (18), further including:

a trigger information generation unit that generates trigger information starting the application, in which the transmission unit transmits the trigger information included in the stream.

(20) A transmission method for a transmission apparatus, including the steps of:

acquiring a stream provided as broadcasting service;

generating signaling information including control information used in an acquisition control of an application delivered through broadcasting or communication; and transmitting the signaling information generated together with the stream in a broadcasting wave of digital broadcasting using an IP transmission method, the signaling information being transmitted at a layer higher than an IP layer in a protocol layer of the IP transmission method in the digital broadcasting.

DESCRIPTION OF REFERENCE NUMERALS 1 broadcasting communication system, 10 data offering server, 20 transmission apparatus, 30 data delivery server, 40 TPT server, 50, 50-1, 50-2 application server, 70 reception apparatus, 90 internet, 212 segment data acquisition unit, 213 trigger information generation unit, 215 signaling information generation unit, 217 application generation unit, 220 transmission unit, 312 segment data acquisition unit, 313 signaling information generation unit, 314 communication unit, 512 application generation unit, 514 communication unit, 712 tuner, 713 filtering processing unit, 714 signaling information acquisition unit, 715 segment data acquisition unit, 716 application engine, 717 control unit, 719 NVRAM, 722 communication unit, 751 channel selection control unit, 752 signaling information analysis unit, 753 filtering control unit, 754 communication control unit, 755 trigger information extraction unit, 900 computer, 901 CPU

The invention claimed is:

1. A reception apparatus, comprising:

receiving circuitry configured to receive a digital broadcast using an IP (Internet Protocol) transmission method; and processing circuitry configured to:
obtain control information from the digital broadcast;
select a channel of the digital broadcast, the channel being identifiable by an IP address;
in accordance with the control information received via the digital broadcast, obtain signaling information for the selected channel via the digital broadcast or a network, the signaling information including application control information for an application;
control acquisition of a whole or a portion of the application via the digital broadcast or the network in accordance with the signaling information; and
execute the application after the application is acquired by the reception apparatus.

2. The reception apparatus according to claim 1, wherein the application is executed in conjunction with an AV content provided as a broadcasting service in the digital broadcast.

3. The reception apparatus according to claim 2, wherein the application is provided as a service same as or different from the broadcasting service.

4. The reception apparatus according to claim 1, wherein the application includes a plurality of components respectively identified in the application control information, and the processing circuitry is configured to control acquisition of the plurality of components delivered using the digital broadcast or the network as respectively indicated in the signaling information.

5. The reception apparatus according to claim 1, wherein the signaling information includes information for acquiring another signaling information for another channel of the digital broadcast when the application is to be acquired from the other channel of the digital broadcast.

6. The reception apparatus according to claim 1, wherein the application is provided as an independent broadcasting service in the digital broadcast.

7. The reception apparatus according to claim 1, wherein the application includes entry point information and one or more resources, and the processing circuitry is configured to control acquisition of the one or more resources via the digital broadcast or the network based on location information of the one or more resources included in the entry point information and the signaling information.

8. The reception apparatus according to claim 7, wherein the signaling information includes a URL (Uniform Resource Locator) of the entry point information, and the processing circuitry is configured to acquire the entry point information based on the URL of the entry point information.

9. A reception method for a reception apparatus, comprising:
receiving a digital broadcast using an IP (Internet Protocol) transmission method;
obtaining control information from the digital broadcast;
selecting a channel of the digital broadcast, the channel being identifiable by an IP address;
in accordance with the control information received via the digital broadcast, obtaining signaling information for the selected channel via the digital broadcast or a network, the signaling information including application control information for an application;
controlling, by circuitry of the reception apparatus, acquisition of a whole or a portion of the application via the digital broadcast or the network in accordance with the signaling information; and
executing the application after the application is acquired by the reception apparatus.

10. The reception method according to claim 9, wherein the signaling information includes information for acquiring another signaling information for another channel of the digital broadcast when the application is to be acquired from the other channel of the digital broadcast.

11. The reception method according to claim 9, wherein the application is executed in conjunction with an AV content provided as a broadcasting service in the digital broadcast.

12. The reception method according to claim 11, wherein the application is provided as a service same as or different from the broadcasting service.

13. The reception method according to claim 9, wherein the application includes a plurality of components respectively identified in the application control information, and
the plurality of components are received via the digital broadcast or the network as respectively indicated in the signaling information.

14. The reception method according to claim 9, wherein the application is provided as an independent broadcasting service in the digital broadcast.

15. The reception method according to claim 9, wherein the application includes entry point information and one or more resources, and
the entry point information includes location information of the one or more resources.

16. The reception method according to claim 15, wherein the signaling information includes a URL (Uniform Resource Locator) of the entry point information.

17. A transmission apparatus, comprising:
processing circuitry configured to:
generate a stream to be transmitted in a channel of a digital broadcast using an IP (Internet Protocol) transmission method, the channel being identifiable by an IP address, and the stream including control information usable for acquisition of signaling information for the channel; and
generate the signaling information for the channel, the signaling information including application control information for an application and usable for acquisition of a whole or a portion of the application via the digital broadcast or a network after transmission of the signaling information; and
transmitting circuitry configured to:
transmit the signaling information and the stream via the channel of the digital broadcast identifiable by the IP address using the IP transmission method; and
transmit the whole or the portion of the application via the digital broadcast when the signaling information indicates that the whole or the portion of the application is to be delivered via the digital broadcast.

18. The transmission apparatus according to claim 17, wherein
the signaling information includes information for acquiring another signaling information for another channel of the digital broadcast when the application is to be delivered using the other channel of the digital broadcast.

19. A transmission method for a transmission apparatus, comprising:
generating, by circuitry of the transmission apparatus, a stream to be transmitted in a channel of a digital broadcast using an IP (Internet Protocol) transmission method, the channel being identifiable by an IP address, and the stream including control information usable for acquisition of signaling information for the channel;
generating, by the circuitry of the transmission apparatus, the signaling information for the channel, the signaling information including application control information for an application and usable for acquisition of a whole or a portion of the application via the digital broadcast or a network after transmission of the signaling information;
transmitting the signaling information and the stream via the channel of the digital broadcast identifiable by the IP address using the IP transmission method; and
transmitting the whole or the portion of the application via the digital broadcast when the signaling information indicates that the whole or the portion of the application is to be delivered via the digital broadcast.

20. The transmission method according to claim 19, wherein
the signaling information includes information for acquiring another signaling information for another channel of the digital broadcast when the application is to be delivered using the other channel of the digital broadcast.

* * * * *